(12) United States Patent
Lah

(10) Patent No.: US 6,660,131 B2
(45) Date of Patent: Dec. 9, 2003

(54) COKE DRUM BOTTOM DE-HEADING SYSTEM

(75) Inventor: Ruben F. Lah, West Jordan, UT (US)

(73) Assignee: Curtiss-Wright Flow Control Corporation, Roseland, NJ (US)

( * ) Notice: Subject to any disclaimer, the term of this patent is extended or adjusted under 35 U.S.C. 154(b) by 6 days.

(21) Appl. No.: 10/096,301

(22) Filed: Mar. 11, 2002

(65) Prior Publication Data

US 2002/0170814 A1 Nov. 21, 2002

Related U.S. Application Data

(63) Continuation of application No. 09/946,917, filed on Sep. 5, 2001, now Pat. No. 6,565,714.
(60) Provisional application No. 60/335,534, filed on Oct. 19, 2001, and provisional application No. 60/275,527, filed on Mar. 12, 2001.

(51) Int. Cl.[7] .................... C10B 25/00; C10B 25/20; C10B 25/22
(52) U.S. Cl. ............... 202/245; 202/242; 202/244; 202/252; 202/262; 49/453
(58) Field of Search ................. 202/105, 120, 202/217, 221, 222, 239, 242, 244, 245, 252, 262, 270; 49/453, 149, 152

(56) References Cited

U.S. PATENT DOCUMENTS

| | | | | |
|---|---|---|---|---|
| 2,317,566 A | * | 4/1943 | Utterback | 202/96 |
| 2,761,160 A | * | 9/1956 | Manning | 15/104.07 |
| 3,379,623 A | * | 4/1968 | Forsyth | 202/252 |
| 4,626,320 A | * | 12/1986 | Alworth et al. | 201/2 |
| 4,960,358 A | * | 10/1990 | DiGiacomo et al. | 414/684.3 |
| 5,048,876 A | * | 9/1991 | Wallskog | 285/364 |
| 5,228,525 A | * | 7/1993 | Denney et al. | 175/122 |
| H1442 H | * | 6/1995 | Edgerton et al. | 196/125 |
| 5,785,843 A | * | 7/1998 | Antalffy et al. | 208/131 |
| 5,876,568 A | * | 3/1999 | Kindersley | 202/424 |
| 6,039,844 A | * | 3/2000 | Malik | 202/227 |
| 6,066,237 A | * | 5/2000 | Kindersley | 202/242 |
| 6,113,745 A | * | 9/2000 | Maitland et al. | 202/262 |
| 6,223,925 B1 | * | 5/2001 | Malsbury et al. | 220/328 |
| 6,228,225 B1 | * | 5/2001 | Meher-Homji | 202/250 |
| 6,254,733 B1 | * | 7/2001 | Lu et al. | 202/245 |
| 6,264,797 B1 | * | 7/2001 | Schroeder et al. | 201/39 |
| 6,264,829 B1 | * | 7/2001 | Antalffy et al. | 208/131 |

* cited by examiner

*Primary Examiner*—Glenn Caldarola
*Assistant Examiner*—Alexa S. Doroshenk
(74) *Attorney, Agent, or Firm*—Kirton & McConkie; Michael F. Krieger

(57) ABSTRACT

The present invention features a coke drum de-heading system that provides unique advantages over prior art de-heading systems, namely the de-heading of a coke drum without having to physically remove the head units. This is essentially accomplished using a specially designed dual seated, linear motion goggle blind gate valve, or de-header valve, that is removably coupled to and seals against the flanged portion of a coke drum much the same way a conventional head unit would be attached. The de-header valve is equipped with, among other things, a sliding blind that is contained and capable of moving within an upper and a lower seat, wherein one of such seats is a floating dynamic, live loaded seat that is capable of automatic adjustment through one or more loading zones so as to seal the blind between the upper and lower seats. The movement of the sliding blind serves to open and close the de-header valve, wherein in a closed position, the de-header valve is prepared to receive the resid byproduct feed from the refinery process used to manufacture coke. Once the drum is full, the de-header valve may be actuated (opened), wherein the coke that has accumulated on the blind is sheared by the upper and lower seats, thus de-heading the coke drum and facilitating the removal of coke using methods commonly known in the art.

23 Claims, 14 Drawing Sheets

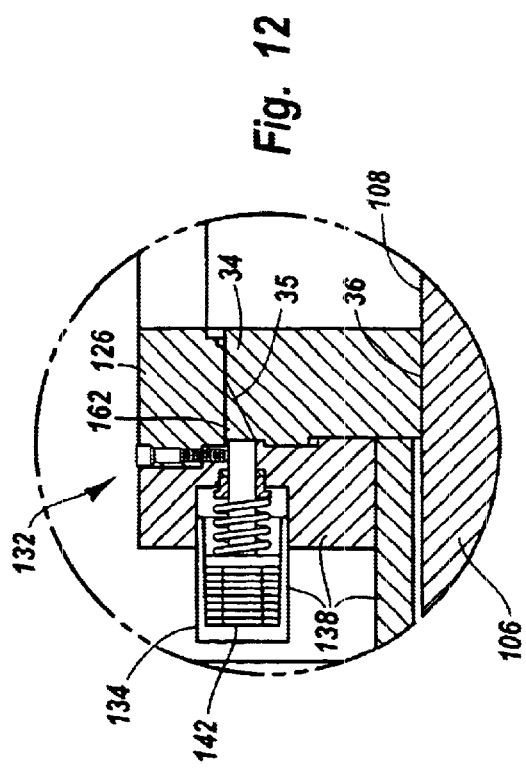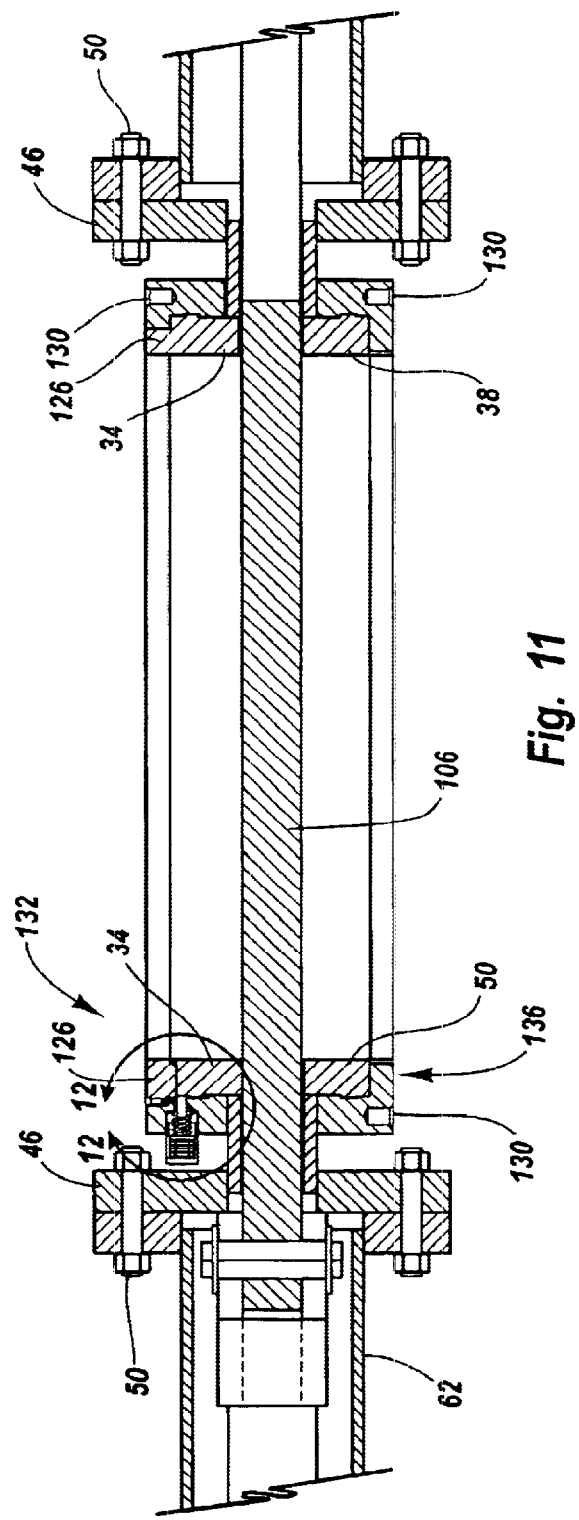

COKE DRUM BOTTOM DE-HEADING SYSTEM

RELATED APPLICATIONS

This application claims priority to U.S. Provisional Patent Application Ser. No. 60/335,534 filed Oct. 19, 2001 entitled, "Improved Coke Drum Bottom De-Heading System;" which is a continuation to U.S. patent application Ser. No. 09/946,917, filed Sep. 5, 2001 now U.S. Pat. No. 6,565,714 entitled, "Coke Drum Bottom De-Heading System", which claims priority to U.S. Provisional Patent Application Ser. No. 60/275,527 filed on Mar. 12, 2001 entitled, "Coke Drum Bottom De-Heading System."

BACKGROUND

1. Field of the Invention

The present invention relates to a system and device for de-heading a vessel containing a fluid, distillates, or unconsolidated debris byproduct, such as the several types of coke. Specifically, the present invention relates to a system and device, namely a de-header valve, that is coupled to a coke drum, particularly at the top or bottom openings, which serves to safely and effectively de-head the coke drum following the manufacture of coke, or other byproducts, and to facilitate the removal of coke during the decoking process.

2. Background

In the hydrocarbon processing industry, many refineries recover valuable products from the heavy residual oil that remains after refining operations are completed. This recovery process is known as delayed coking and produces valuable distillates and coke in large vessels or coke drums. Coke drums are usually in operation in pairs so that when one coke drum is being filled with the byproduct or residual material, the feed may be directed to an empty drum so that the filled drum may be cooled and the byproduct purged from the coke drum, a process known as decoking. This allows the refinery process to operate in a continuous manner, without undue interruption.

When one coke drum is full, it must be purged of the byproduct fed into it. The drum is steam purged and cooled with quench water. The drum is then drained of water and vented to atmospheric pressure, after which the top and bottom heads are removed (i.e. the coke drum is de-headed) to allow the coke to be cut from the drum and fall into a catch basin, typically a rail car. This process of de-heading the coke drum can be extremely dangerous for several reasons. To mention only a few, the cooling water introduced into the hot drums prior to the removal of the bottom head becomes extremely hot and could leak from the loosened head and scald surrounding operators, the load of un-drained water and loose coke within the drum may exceed the limits of the support system and cause heavy equipment to fall, positioning the chute and necessary removal of the flanges or heads is done with operators who are in close proximity to the drums, potentially falling coke may injure workers as the heads are removed, and operating personnel may be exposed to finely divided coke particles, steam, hot water and noxious gases, when the drum is opened. Indeed several fatalities occur each year as a result of this manufacturing process. Once the coke is removed, the heads are replaced and the coke drum is prepared to repeat the cycle.

Prior art systems and methods have tired to more efficiently and effectively de-head coke drums, as well as to minimize many of the dangers inherent is the de-heading process. One such method involves placing a de-heading cart under the drum, raising a flange support ram, with braces installed, and loosening some (up to one half) of the flange bolts by manual operation with an impact wrench. Following the water quench and drain, the remaining bolts are manually removed, braces are removed from the ram, the approximately 4-ton flange is lowered, and the cart, with flange resting thereon, is moved away. This is extremely dangerous due to the manual labor requirements.

Other systems have been disclosed, which somewhat reduce human or manual involvement. For example, U.S. Pat. No. 4,726,109 to Malsbury et al. and U.S. Pat. No. 4,960,358 to DiGiacomo et al. describe a remote unheading device for coking drums. The device includes a head unit for attachment to a lower flange of a coking drum and a plurality of swing bolts which are disconnected by remotely operated de-tensioning equipment. A platform device lowers the head unit, moves it laterally to one side and tips it for cleaning. A chute attached to the frame can be raised into engagement with the coking drum lower flange for removal of coke from the drum.

U.S. Pat. No. 5,098,524 to Antalfy et al. filed on Dec. 10, 1990 discloses a coke drum unheading device having a pivoting actuator system operable from a location remote from a drum outlet. The actuator is adapted to move a drum head between closed and open positions and to retain the drum head in a closed position under a load.

U.S. Pat. No. 5,500,094 to Fruchtbaum provides a coke drum unheading device that retracts and tilts the bottom head incrementally so that falling debris such as shot coke can be caught by a chute. Following disposal of the loose debris, the head can be withdrawn from the area of the drum for maintenance. Specifically, the invention provides an unheading device for removing a bottom head from a flange on a lower end of a coke drum. An unheading car is horizontally movable into and from position below the bottom head. A vertically adjustable bottom head support member is mounted on the car. A bearing plate is pivotally mounted at an upper end of the support member for engaging a lower surface of the bottom head. A retractable arm has first and second sections hingedly connected at one end and having respective opposite ends secured to the bearing plate and the support member for pivoting the bearing plate and bottom head supported thereon with respect to horizontal, preferably to tilt the head towards an adjacent chute.

U.S. Pat. No. 5,581,864 to Rabet discloses an apparatus and method enabling removal of the drum head of a coke drum, which comprises an apparatus remotely placing a carriage under the drum head and the carriage is adapted to remotely engage the drum head, tightly support the head against the drum while workers are in the area, and to lower the head and carry it away. A safety feature is also included and disclosed, wherein the carriage is normally supported by springs which, in the event of excessive loads, automatically transfers the load carrier to an overhead beam designed to carry any excessive loads.

Each of these prior art devices share common deficiencies in that they are incapable of providing simple, efficient, and safe solutions to the de-heading of a coke drum. Specifically, each of the assemblies or devices require that the head unit be completely removed from the flange portion of the coke drum after each coking cycle and prior to the purging of the coke from the coke drum. This creates an extreme hazard to workers and provides an inefficient and time consuming procedure. Removal of the head unit increases the chance for accident, while at the same time increases human involvement as the head unit must be properly placed on the coke drum each time despite the automation involved. In addition, a large amount of floor space is required to accommodate those assemblies and devices that automate the removal and lifting of the head unit from the coke drum. Finally, such devices and systems may not be operable in an environment where there the bottom headroom is less than the diameter of the bottom head.

As with every industry in the modern world, advances in technology are made for several reasons, some of which include safety, reliability, economy, ease of operation and maintenance, utility, and other beneficial areas. If advancement of a technology provides improvements in any of the above categories it has true value. Generally speaking, advances in Coker technology have come gradually as competing companies have built upon existing technologies or operational methods by making improvements and modifications to base designs or concepts. Through this process, some technologies utilized in the Delayed Coking industry have become optimized, meaning that we have maximized the benefits that can be derived from them.

The general trends in the Delayed Coking industry is towards increased safety and reliability. It goes without saying that improved economy, utility, and ease of maintenance would be added and welcomed benefits of any innovation that effectively satisfies the first two requirements. It is for the case of safety that many owners and operators of Coker units are thinking forward to the time when total automation of a Coker Unit becomes a possibility and a reality. Obviously, there are many technical challenges associated with accomplishing this goal. Presently, one of the manor roadblocks of the total automation concept is the coke drum unheading methods used. Whether drum unheading is done manually, or by any one of the above discussed prior art systems and devices that are currently available, there is a significant hands on component required in the process. As is well known in the industry, the hands on component of undeading always was, and remains today, very hazardous for operating personnel.

SUMMARY AND OBJECTS OF THE INVENTION

In light of the problems and deficiencies inherent in prior art coke drum de-heading systems and devices, the present invention seeks to provide more efficient, cost-effective, and safe coke drum de-heading device and system. The present invention seeks to provide a revolutionary new approach to unheading or de-heading a coke drum that is entirely outside the scope and technology of any prior art system, device, or method.

Therefore, it is an object of some embodiments of the present invention to provide a simplified and reliable coke drum de-heading system that does not require the physical removal of the coke drum heads after each coking cycle, but rather comprises a mechanical de-header valve that accomplishes the equivalent de-heading function of prior art designs and methods.

It is another object of some embodiments of the present invention to provide a coke drum de-heading system, wherein the de-header valve is removably coupled to the flanged portion of a coke drum and adapted to de-head the coke drum without having to be removed after each coking cycle.

It is still another object of some embodiments of the present invention to provide a coke drum de-heading system having a dual seated, linear motion, 100% metal sealed isolation device, or more specifically, a fully enclosed, hydraulically powered double sealed and pressurized linear goggle blind.

It is still another object of some embodiments of the present invention to provide a coke drum de-heading system capable of repeated and automatic de-heading and re-heading of a coke drum without any manned or manual activity at or by the coke drum.

It is a further object of some embodiments of the present invention to provide a coke drum de-heading system having a linear motion blind as the only major moving part.

It is still a further object of some embodiments of the present invention to provide a coke drum de-heading system that connects to the coke drum via a flanged bolted connection.

It is still a further object of some embodiments of the present invention to provide a coke drum de-heading system having dual independent seats that provide double block and bleed and double block and purge capabilities.

It is still a further object of some embodiments of the present invention to provide a coke drum de-heading system having metal to metal seating.

A still further object of some embodiments of the present invention is to provide one or more dynamic or live loaded seats energized from outside the process stream.

A still further object of some embodiments of the present invention is to provide a system design having remote verification of positive isolation.

A still further object of some embodiments of the present invention is to provide a system having instant and remote live switching to double block and vent mode from double block and purge mode upon loss of purge steam.

To achieve the foregoing objects, and in accordance with the invention as embodied and broadly described herein, the present invention features a coke drum de-heading system that provides unique advantages over prior art de-heading systems, namely the de-heading of a coke drum without having to physically remove the head units. This is essentially accomplished using a specially designed de-header valve to be used in a de-header system.

Specifically, the de-header system comprises a dual seated, linear motion goggle blind gate valve, or de-header valve, that is removably coupled to and seals against the flanged portion of a coke drum much the same way a conventional head unit would be attached. The de-header valve is equipped with a sliding blind having an orifice therein, a flat surface adjacent the orifice, a stroke slightly greater than the diameter of the orifice in the de-header valve, and upper and lower seats, wherein one of such seats is a dynamic, live loaded seat that is capable of automatic adjustment so as to seal the blind between the upper and lower seats. As such, the sliding blind can be moved in a substantially linear bi-directional manner between upper and lower seats, or dual seats, thus causing the orifice located thereon to move between an open, closed, and partially open position relative to the orifice in the coke drum. In a closed position, the de-header valve and coke drum are prepared to receive the byproduct feed from the refinery process used to manufacture coke. Once the drum is full, the valve may be actuated causing the sliding blind to open. In doing so, coke that has accumulated on the blind is sheared by the upper and lower seats, thus de-heading the coke drum and facilitating the removal of coke using methods commonly known in the art. An advantage of the present invention is its ability to provide a simple, yet effective de-heading system comprising a de-header valve having a sliding bind that moves back and forth between dual independent seats to de-head a coke drum and simplify the decoking process. Another advantage of the present invention is the ability to de-head the coke drum without having to remove the head unit, and to do so at a remote location with little or no manual requirements.

In a preferred embodiment, the present invention features a coke drum de-heading system comprising (a) at least one coke drum containing manufactured coke therein, wherein the coke drum has a top orifice and a bottom orifice; (b) a de-header valve removably coupled to the coke drum and designed to facilitate the removal of coke from the coke drum by de-heading the coke drum and allowing the coke to pass there through; and (c) an exchange system, including an upper and lower bonnet and other elements and members adapted to integrate the de-heading system, and particularly the de-header valve, into the manufacturing system. The de-header valve itself comprises (1) a main body having an orifice dimensioned to align, in a concentric relationship, with either the top or bottom orifice of the coke drum when the de-header valve is coupled thereto; (2) a live loaded seat assembly coupled to the main body and comprising a floating dynamic, live loaded seat, a live seat adjustment mechanism coupled to the main body and designed to control and adjust the force and resulting seat load of the dynamic, live loaded seat, and a force transfer module in juxtaposition to the dynamic, live loaded seat for transferring the force from the live loaded seat adjustment mechanism to the dynamic, live loaded seat; (3) a static seat positioned opposite from and counteracting or counterbalancing the dynamic, live loaded seat; and (4) a blind or sliding blind capable moving in a linear, bi-directional manner within the de-header valve and between the dynamic, live loaded seat and the static seat, the blind physically controlled by an actuator and having a force exerted thereon by the dual seats, namely the dynamic, live loaded seat and the static seat, such that a seal is created between the dynamic, live loaded seat, the blind, and the static seat. In essence, the de-header valve de-heads the coke drum and facilitates the removal of the coke from the coke drum upon actuation of the blind from a closed to an open position wherein the coke is sheared.

The present invention further comprises a point to point sealing system comprising independent dual seats that seal directly against the gate. The seal consists of or is a result of the metal to metal seating between the upper and lower seats and the blind. Due to a dynamic, loaded upper seat, the amount of force required to properly seal the seats to the gate is accomplished using a live load seat adjustment mechanism designed to control the amount of force exerted on the blind.

The present invention advantageously provides a floating seat concept to the de-header valve using a dynamic, live loaded seat. This floating dynamic, live loaded seat is continuously loaded against the blind to provide a biased relationship between the seat and the blind. The floating seat concept is accomplished using one or a combination of biasing members, such as heavy coil springs arrayed at close centers around the perimeter of the seat ring; externally live loaded and sealed seat force applicators arrayed at quadrants around the floating seats; and/or a full perimeter flexible inconnel bellow seal spring placed between the floating seat and the seat retaining ring.

As a result, the present invention provides a new and improved coke drum de-heading system. The system also utilizes pressure valves and steam purge inlet valves, as well as emergency vent valves to monitor and control pressure within the system and to prevent inadvertent venting of the steam to atmosphere.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

FIG. 11 illustrates the workings of the live or dynamically loaded seat concept and its relation to the sliding blind according to the present invention;

FIG. 12 illustrates a detailed view of the dynamic, live loaded seat and the live seat adjustment mechanism;

DETAILED DESCRIPTION OF THE PREFERRED EMBODIMENTS

Figure 1:
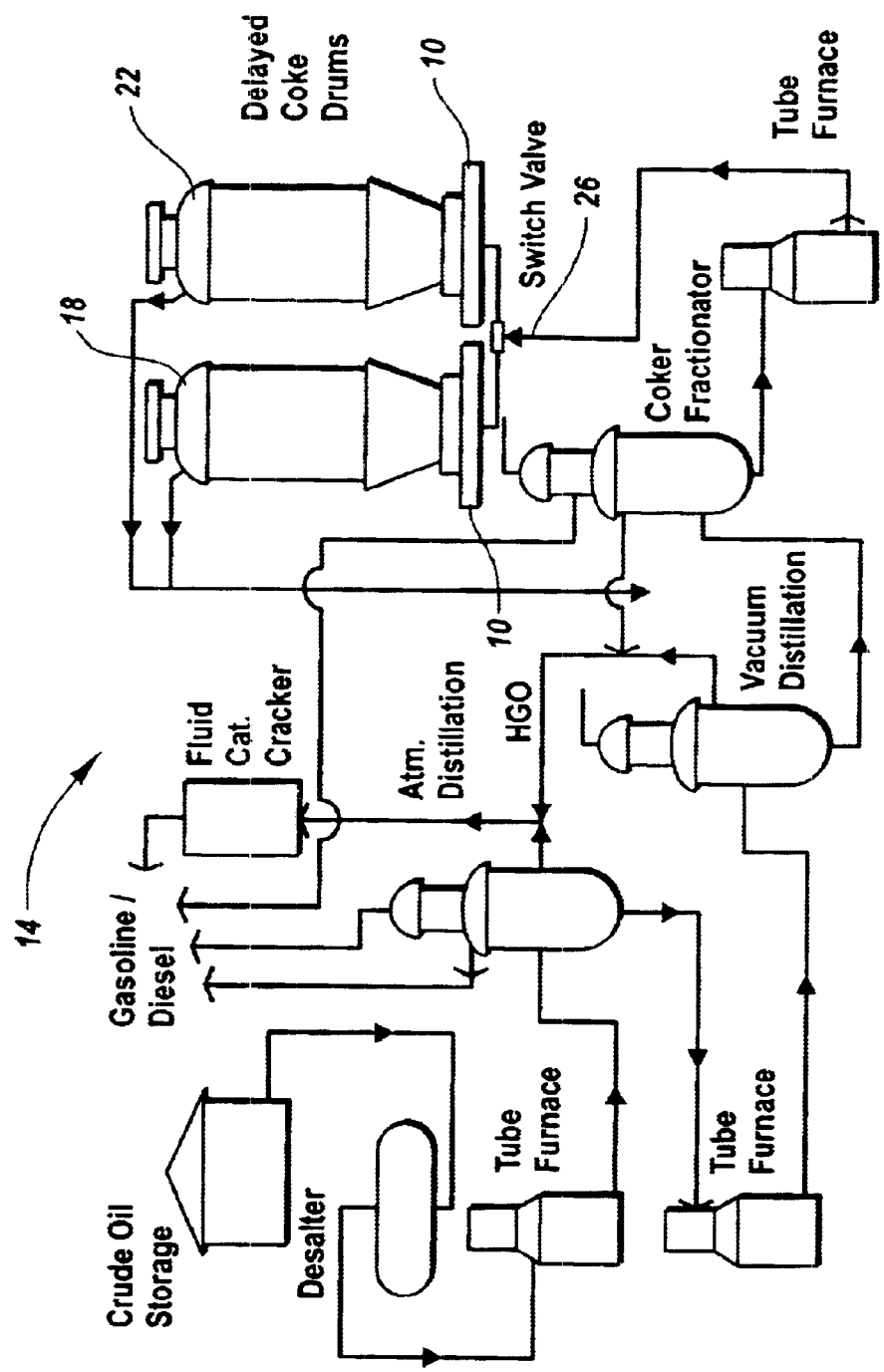
FIG. 1 illustrates, generally, the refinery process, wherein coke is manufactured from the refinery byproducts in a series of coke drums.

It will be readily understood that the components of the present invention, as generally described and illustrated in the figures herein, could be arranged and designed in a wide variety of different configurations. Thus, the following more detailed description of the embodiments of the system, device, and method of the present invention, and represented in FIGS. 1 through 11, is not intended to limit the scope of the invention, as claimed, but is merely representative of the presently preferred embodiments of the invention.

The presently preferred embodiments of the invention will be best understood by reference to the drawings wherein like parts are designated by like numerals throughout. Although reference to the drawings and a corresponding discussion follow below, it is first advantageous to provide a general background of the coking process, including the process of de-heading the coke drums at the end of a manufacturing cycle.

General Discussion on Delayed Coking and Coke De-Heading

In the typical delayed coking process, high boiling petroleum residues are fed to one or more coke drums where they are thermally cracked into light products and a solid residue—petroleum coke. The coke drums are typically large cylindrical vessels having a top head and a conical bottom portion fitted with a bottom head. The fundamental goal of coking is the thermal cracking of very high boiling point petroleum residues into lighter fuel fractions. Coke is a byproduct of the process. Delayed coking is an endothermic reaction with a furnace supplying the necessary heat to complete the coking reaction in a drum. The exact mechanism is very complex, and out of all the reactions that occur, only three distinct steps have been isolated: 1) partial vaporization and mild coking of the feed as it passes through the furnace; 2) cracking of the vapor as it passes through the coke drum; and 3) cracking and polymerization of the heavy liquid trapped in the drum until it is converted to vapor and coke. The process is extremely temperature-sensitive with the varying temperatures producing varying types of coke. For example, if the temperature is too low, the coking reaction does not proceed far enough and pitch or soft coke formation occurs. If the temperature is too high, the coke formed generally is very hard and difficult to remove from the drum with hydraulic decoking equipment. Higher temperatures also increase the risk of coking in the furnace tubes or the transfer line. As stated, delayed coking is a thermal cracking process used in petroleum refineries to upgrade and convert petroleum residuum (or resid) into liquid and gas product streams leaving behind a solid concentrated carbon material, or coke. A fired heater is used in the process to reach thermal cracking temperatures, which range upwards of 1,000° F. With short residence time in the furnace, coking of the feed material is thereby "delayed" until it reaches large coking drums downstream of the heater. In normal operations, there are two coke drums so that when one is being filled, the other may be purged of the manufactured coke. These coke drums are large structures that are approximately 25–30 meters in height and from 4 to 9 meters in diameter. They are equipped with a top blind flange closure or orifice that is typically about 1.5 meters in diameter, and a bottom blind flange orifice that is typically about 2 meters in diameter.

In a typical petroleum refinery process, several different physical structures of petroleum coke may be produced. These are namely, shot coke, sponge coke, and/or needle coke, and are each distinguished by their physical structures and chemical properties. These physical structures and chemical properties also serve to determine the end use of the material. Several uses are available for manufactured coke, some of which include fuel for burning, the ability to be calcined for use in the aluminum, chemical, or steel industries, or the ability to be gasified to produce steam, electricity, or gas feedstock for the petrochemicals industry.

To produce the coke, a delayed coker feed originates from the crude oil supplied to the refinery and travels through a series of process members and finally empties into one of the coke drums used to manufacture coke. A basic refinery flow diagram is presented as FIG. 1, with two coke drums shown. The delayed coking process is a batch-continuous process, which means that the process is ongoing or continuous as the feed stream coming from the furnace alternates filling between the two or more coke drums. As mentioned, while one drum is on-line filling up with coke, the other is being stripped, cooled, decoked, and prepared to receive another batch. This is a timely process, with each batch in the batch-continuous process taking approximately 12–20 hours to complete. In essence, hot oil, or resid as it is commonly referred to as, from the tube furnace is fed into one of the coke drums in the system. The oil is extremely hot and produces hot vapors that condense on the colder walls of the coke drum. As the drum is being filled, a large amount of liquid runs down the sides of the drum into a boiling turbulent pool at the bottom. As this process continues, the hot resid and the condensing vapors cause the coke drum walls to heat. This naturally in turn, causes the resid to produce less and less of the condensing vapors, which ultimately causes the liquid at the bottom of the coke drum to start to heat up to coking temperatures. After some time, a main channel is formed in the coke drum, and as time goes on, the liquid above the accumulated coke decreases and the liquid turns to a more viscous type tar. This tar keeps trying to run back down the main channel which can coke at the top, thus causing the channel to branch. This process progresses up through the coke drum until the drum is full, wherein the liquid pools slowly turn to solid coke. When the first coke drum is full, the hot oil feed is switched to the second coke drum, and the first coke drum is isolated, steamed to remove residual hydrocarbons, cooled by filling with water, opened, and then decoked. This cyclical process is repeated over and over again in the manufacture of coke.

The decoking process is the process used to remove the coke from the drum upon completion of the coking process. Due to the shape of the coke drum, coke accumulates in the area near and attaches to the heads during the manufacturing process. To decoke the drum, the heads must first be removed. Typically, once full, the drum is vented to atmospheric pressure and the top head (typically a 4-foot diameter flange) is unbolted and removed to enable placement of a hydraulic coke cutting apparatus. After the cooling water is drained from the vessel, the bottom head (typically a 7-foot-diameter flange) is unbolted and removed. This process is commonly known as "de-heading" and can be a very dangerous procedure because of the size of the flanges, the high temperatures within the drum, potential falling coke, and other reasons as mentioned above. Once the heads are removed, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or loading facilities.

Present Invention Coke Drum De-Heading System

Although the present invention is intended to cover both top and bottom de-heading systems, or rather the de-heading system of the present invention may be applicable and utilized on both the top and bottom openings of a coke drum, the following detailed description and preferred embodiments will be discussed in reference to a bottom de-heading system only. One ordinarily skilled in the art will recognize that the invention as explained and described herein for a coke drum bottom de-heading system may also be designed and used as a coke drum top de-heading system and the following discussion pertaining to the bottom de-heading system is not meant to be limiting to such.

The present invention describes a method and system for de-heading a coke drum following the manufacture of coke therein. As the present invention is especially adapted to be used in the coking process, the following discussion will relate specifically in this manufacturing area. It is foreseeable however, that the present invention may be adapted to be an integral part of other manufacturing processes producing various elements or by products other than coke, and such processes should thus be considered within the scope of this application.

Prior to reciting the specifics of the present invention, it should be noted that the present invention system and method is designed having or possessing significant functional, utility, and safety advantages. First, the system is capable of repeated and automatic unheading (or de-heading) and re-heading of a coke drum without any manned activity at or nearby the coke drum. Thus safety and efficiency are both dramatically increased. Second, the system reduces the total de-heading and re-heading time to less than 10 minutes. Such a time is a dramatic improvement over the times of prior art de-heading systems. Third, the system may be permanently attached directly to the coke drum flange or to a transition spool above the device and to a stationary coke chute below the device, which chute discharges directly into the pit or into rail cars. Fourth, the system has the flexibility to allow safe drainage of coke and drum water through its outlet port and into the pit without any spillage onto the de-heading deck. Fifth, the system is designed and constructed in a way to ensure long term operation without clogging or being operationally obstructed by coke particles, chunks, resid, or any other foreign matter. Sixth, the system is designed to be able to demonstrate, with absolute certainty, at all times and at all local and remote locations that it is positively isolating. Seventh, the system is virtually maintenance free except for long term parts replacement during scheduled shutdowns. Eighth, the system is capable of incorporating diagnostic capabilities that allow real time assessment and trending of the condition of sealing components during normal operations, in order to facilitate planned maintenance. Ninth, the system is easy to install as compared with other systems, and is field serviceable. Tenth, the system is cost competitive with existing technology, yet significantly outperforms this technology in virtually every aspect.

Specifically regarding safety issues, there is no exposure to coke drum contents, whether onto the de-heading deck or to personnel, anywhere or at anytime during the coke drum de-heading process, or during any automated, manual, or inadvertent operation of the device at any time during a switching cycle. Also, the system comprises a simply hydraulic design with one hydraulic power unit and one cylinder, and one supply and one return hydraulic line, therefore, there is less exposure to possible leaks during commissioning and startup as well as less opportunity for accidental or inappropriate normal operation. Further, the system comprises a positive mechanical lockout device in the form of a lockout pin, that is incorporated for both open and closed positions. Still further, a compact hydraulic backup device for the open and close functions is supplied with the system, or is easily installed at the site, without exposing personnel. Still further, coke drum inlet feed line coupling and alignment devices are not required, therefore, there are no inlet line-coupling gaskets to replace or clean following each drum cycle, or exposure to personnel due to coupling misalignment and leakage.

Specifically regarding reliability, the system comprises a simple hydraulic design as described above. The system also comprises one major moving part instead of multiple moving parts as found on existing devices and systems.

Specifically regarding economy, there are no head gaskets to replace after each drum cycle or after a failed coke drum pressure test. Furthermore, very little to no routine maintenance is required during normal operation. Still further, the system comprises a compact and basic operating control console that can be strategically located and installed with minimal effort and with all desired safety interlocks. Still further, the system comprises internal diagnostic capabilities that allow the operator to schedule maintenance to coincide with planned shutdown times. Still further, no water flushing of moving parts is required. Still further, the coke drum inlet feed line coupling and alignment devices are not required, thus there are no inlet line coupling gaskets to replace or clean after each cycle. Still further, minimum spare parts are required to be kept on hand, thus parts and storage costs can be reduced. Finally, the system can be configured to allow drainage of the drum water directly through the port.

Specifically regarding ease of operation and maintenance, only an open and closed function is required, there is no water flushing of moving parts required, there is no head gasket surface cleaning required, which in most cases is difficult to perform, and requires special tools, there are minimal spare parts required, and the operating system is strategically located and compact and easy to use.

Specifically regarding utility, the system is designed to be used on either the top or bottom ports of the coke drum.

The present invention features a system comprising a dual seated, linear motion, fully metal seated isolation device, or specifically, a fully enclosed, hydraulically powered, double sealed and pressurized linear goggle blind valve, or de-header valve. The de-header valve has only one mamor moving part, the blind, which assures simplicity, reliability, and ease of maintenance. The dual, metal seat surfaces, the body interior and all internal parts are fully protected and isolated from any process media in the fully open or fully closed positions. The materials used in the construction of all sealing parts are resistant to corrosion, and are designed for exceptionally high metal to metal cycle duty. The seals of the de-heading valve are designed to cleanly break the bond between the coke and the top surface of the blind at each stroke. The total thrust required for this action combined with the thrust required to overcome seating friction and inertia is accomplished by actuating the blind.

During the initial stages of coking, the surfaces of the blind will distort due to uneven heat distribution throughout the thickness of the plate. Thus, in order to compensate for thermal expansion and thermal distortion of the blind during heat up, the externally live loaded metal seals of the de-heading device are designed to articulate axially and transversely as well as conform to the camber of the sliding blind at maximum differential temperature. This unique capability, combined with a continuously pressurized body, assures the integrity of the seal across the de-heading valve at all times during the switching cycle.

Turning to the Figures of the present invention and a more detailed analysis, FIG. 1 depicts, generally, a petroleum manufacturing and refinery process 14 having several elements and systems present (identified, but not discussed). In addition to these elements, petroleum manufacturing and refinery process 14 includes first and second delayed coke drums 18 and 22, respectively. As mentioned, there are typically two coke drums in simultaneous operation so as to permit the ongoing manufacture and refinery of petroleum as well as its coke byproduct. While first coke drum 18 is online and being filled via feed inlet 26, second coke drum 22 is going through a decoking process to purge the manufactured coke contained therein. Thereafter, when first coke drum 18 has reached capacity, feed inlet 26 is switched to second coke drum 22 that has just previously been purged of its contents, whereby first coke drum 18 is primed for the decoking process where its contents will be purged. This process, commonly referred to as batch-continuous, allows the refinery to maintain continuous uninterrupted operation. Of course there may be only one coke drum or a plurality of coke drums present. FIG. 1 also shows the addition of coke drum de-heading system 10, including de-header valve 12 and its place within the refinery process. Although FIG. 1 is illustrative of a petroleum manufacturing and refinery process having two coke drums in series, and although the discussion and preferred embodiments illustrated, described, and discussed herein focus on a coke drum de-heading system, one ordinarily skilled in the art will recognize that the present invention may be applicable or adapted to a number of different processes in which a function similar to the coking process is present.

Figure 2:
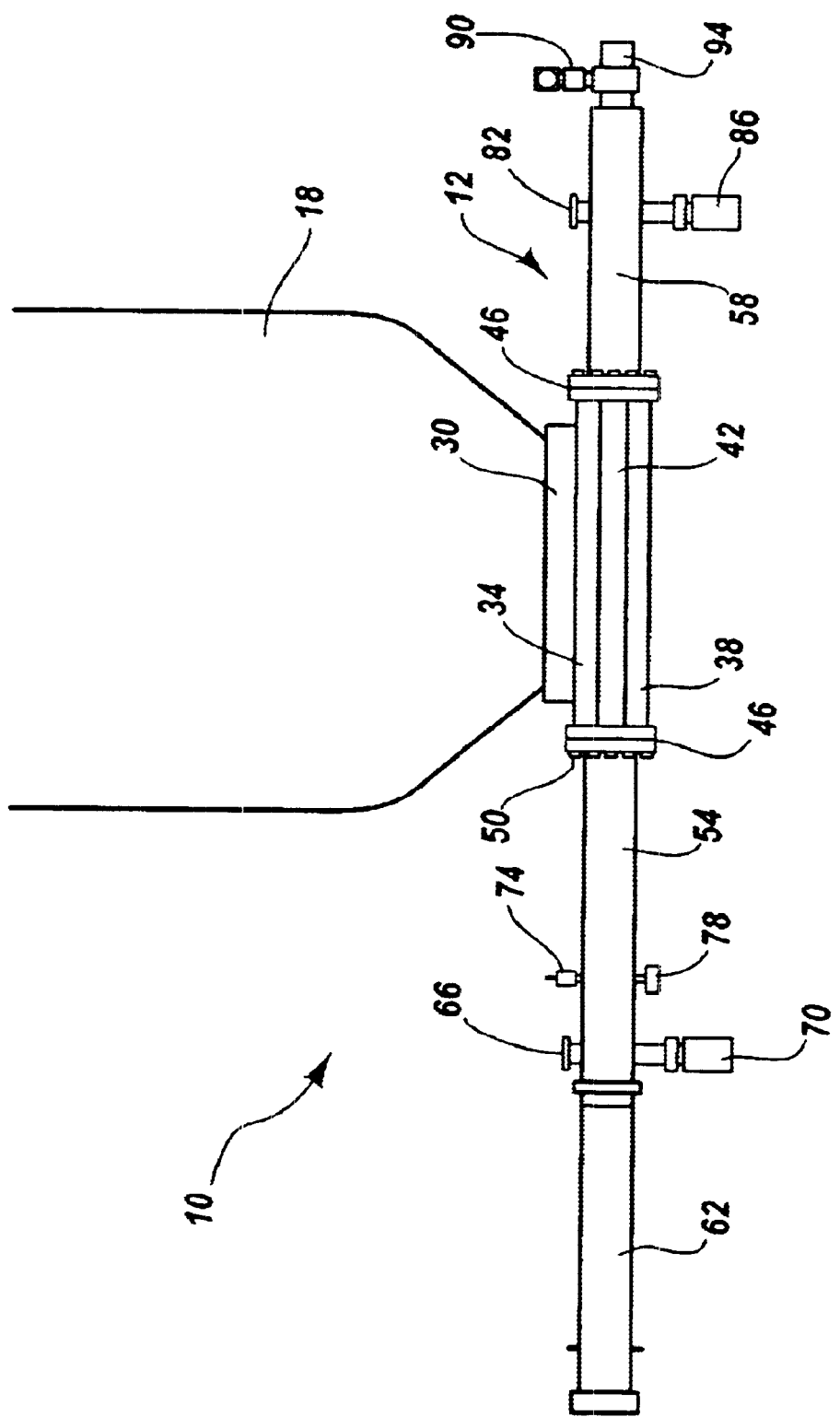
FIG. 2 illustrates the de-heading system of the present invention coupled to a coke drum and an upper and lower bonnet.
Figure 3:
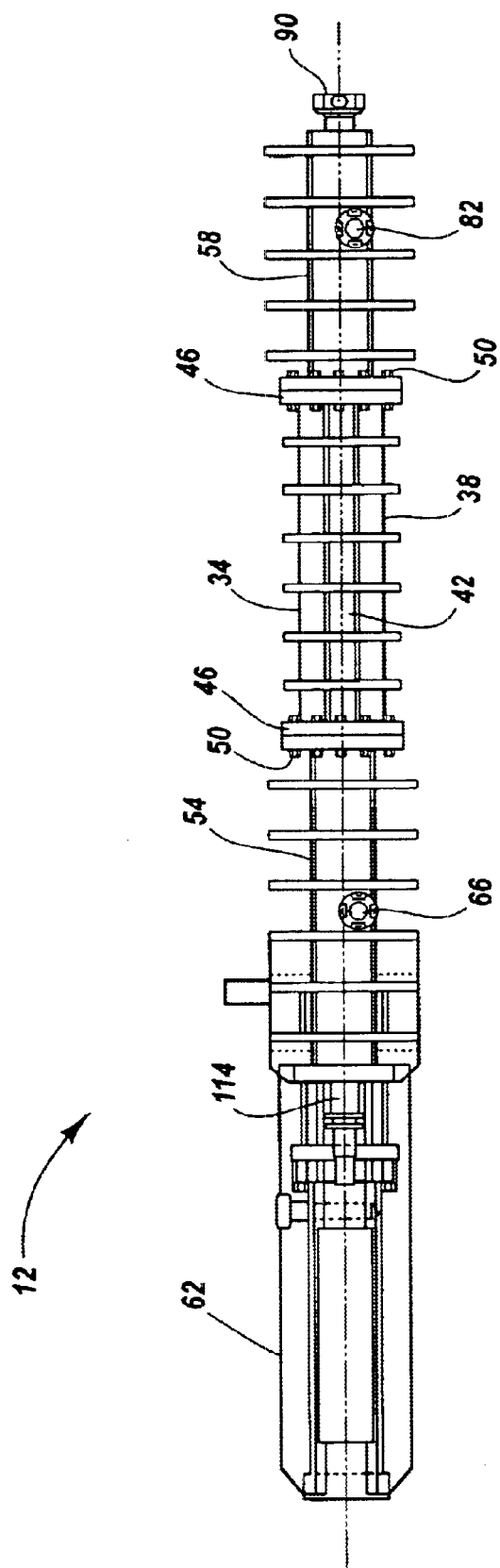
FIG. 3 illustrates a front view of the coke drum de-heading system according to the present invention, and an upper and lower bonnet attached thereto.

In reference to FIGS. 2 and 3, a general front view of coke drum de-heading system 10 is shown, with FIG. 2 showing system 10 attached or coupled to first coke drum 18. In light of the identical nature and setup of coke drum de-heading systems 10 on first and second coke drums 18 and 22 respectively, only first coke drum 18 will be discussed throughout the application. Specifically, coke drum de-heading system 10 is removably coupled to coke drum 18 to allow the system to be removed if necessary. As shown, coke drum de-heading system 10 comprises a de-header valve 12 having a body 46 and upper and lower seats, 34 and 38 respectively, attached thereto. Body 46 comprises a flanged portion 42 that consists of substantially the same dimensions as the corresponding opening, whether flanged or otherwise, of coke drum 18. As shown, flanged portion 42 is coupled to flanged portion 30 on coke drum 18 using those means known in the art, which is typically a bolted flanged connection. Flanged portion 30 is a part of the "head" of coke drum 18, depending upon the design of coke drum 18, de-header valve 12 may be coupled to flanged portion 30 or directly to the body of coke drum 18. The significance of the present invention, as opposed to prior art de-heading systems and devices, is that the coke drum de-heading system 10 of the present invention does not require the "head" of the coke drum to be removed each time the drum is to be decoked. This significance is discussed at greater length below. Various sealing members and agents are used to seal de-header valve 12 to coke drum 18 to prevent inadvertent leaking.

Upper seat 34 and lower seat 38 are comprised of a dynamic, live loaded seat and a static seat, with the preferred configuration comprising a dynamic live loaded upper seat 34, and a static lower seat 38. An alternative embodiment may comprise a dynamic, live loaded lower seat and a static upper seat. In the preferred embodiment, the static seat is a one piece seat that is securely fastened to de-header valve 12 and is preferably nonadjustable. However, it is not without the scope of this invention that both the upper and lower seats could be dynamic and/or adjustable. In contrast to the static seat, dynamic, live loaded seat is a moveable and adjustable seat that is energized from without the process stream via live seat adjustment mechanism. The function of the dynamic, live loaded seat is to provide point to point fine tuning of the system, and particularly the blind as it is sealed between upper and lower seats 34 and 38. Various sealing members, such as O-rings, may be used to seal the seats and their adjacent seat retainers to de-header valve 12.

FIGS. 2 and 3 also depict upper bonnet 54 and lower bonnet 58 coupled to body 46 of de-header valve 12. Upper bonnet 54 and lower bonnet 58 are removably coupled to body 46 using known means such as bolts 50 as shown. Upper bonnet 54 and lower bonnet 58 are shown having various elements thereon to operate within the refinery process. Upper bonnet 54 is shown equipped with steam purge outlet port 66 and an outlet steam trap and orifice assembly 70. Upper bonnet also is shown having a pressure transmitter 74 and a pressure gauge 78. Lower bonnet 58 is shown having a steam purge inlet port 82 and an inlet steam trap and orifice plate assembly 86 coupled thereto. Lower bonnet 58 also is shown having a vent valve assembly 90 and outlet pipe 94. Vent valve assembly is located on a distal end of lower bonnet 58 and serves as an emergency release. Upon the introduction of a pressure into the system that is above the upper limit, emergency vent valve is activated, which releases pressure from the system and drains any excess fluid and gas through pipe 94. Each of these additions are used to control and monitor the pressurized environment existing within the system. One ordinarily skilled in the art will recognize the needed applications and devices to maintain a suitable environment during the coking process.

In addition to the features mentioned above, upper and lower bonnets 54 and 58, respectively, are independent of one another, yet may be in communication with one another. For example, depending upon the system requirements and specifications, upper bonnet 54 may be pressurized and lower bonnet 58 may be purged to maintain system equilibrium requirements.

FIGS. 2–3, and 6–8 are also illustrative of actuator 62 and ram 114. Actuator 62 is used to drive ram 114, which provides the actual physical control of the blind (not shown) of de-header valve 12. Actuator 62 and ram 114 provide the sliding later bi-directional movement to the blind, which is used to open and close de-header valve 12 as needed. A significant advantage to the present invention is the ability to virtually eliminate human or manual involvement during the manufacturing process. For example, due to the design and functionality of de-header valve 12 actuator 62 may be controlled or actuated from a location remote from the actual site of the coke drums. As actuator 62 is a hydraulic pump in a preferred embodiment, it is not necessary to actually activate actuator 62 at the site. Rather, any known means in the art may be used to control actuator 62 a safe distance away from the coke drums. As a result, the safety, and ease of operation provide an advantage not found in prior art designs. Actuator 62 and ram 114 are each discussed in greater detail below in accordance with their corresponding figure(s).

Figure 4:
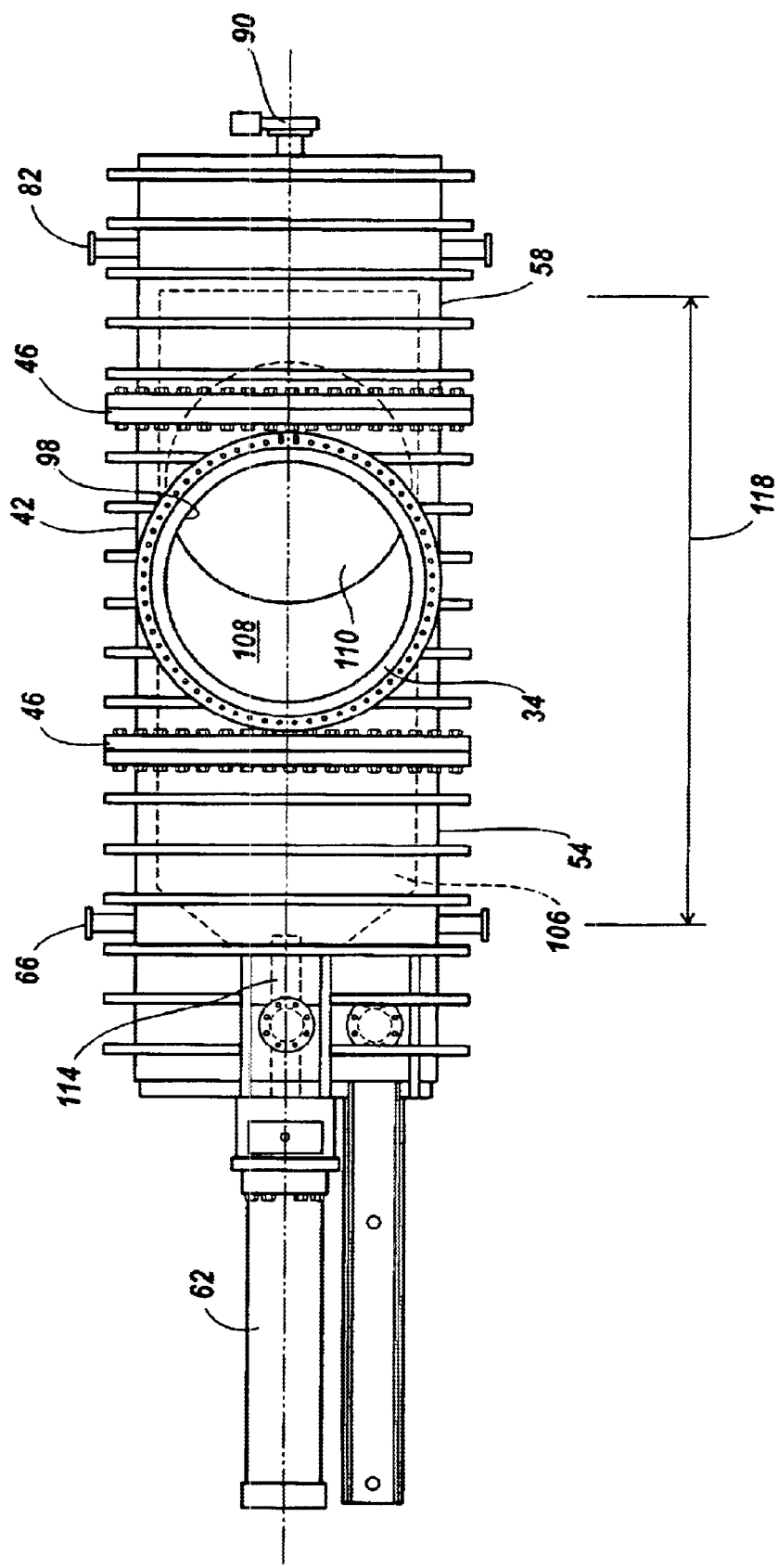
FIG. 4 illustrates a top view of the coke drum de-heading system showing the orifice and the sliding blind contained therein with the sliding blind in a partially open position.
Figure 5:
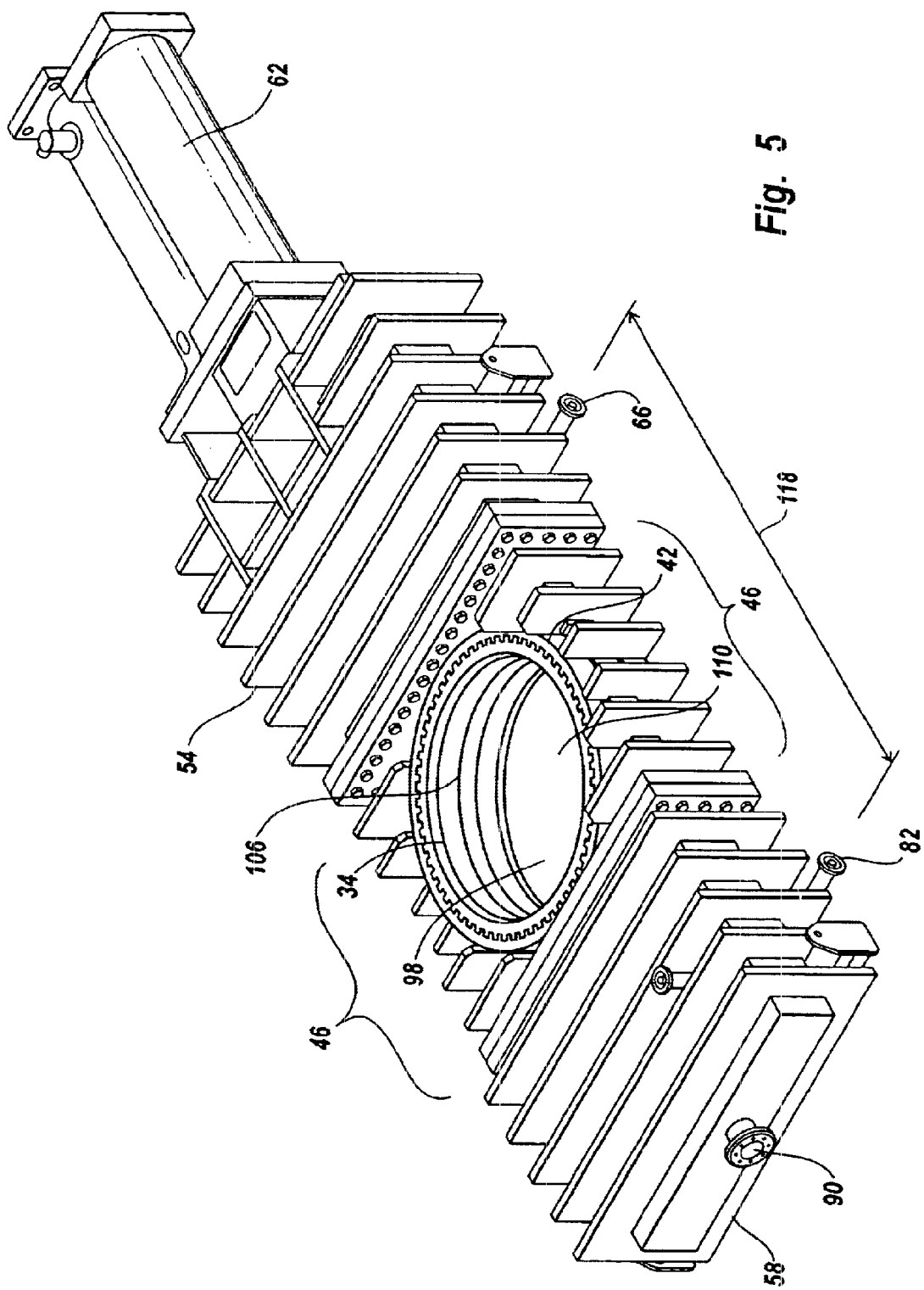
FIG. 5 illustrates a perspective view of the de-header valve of the coke drum de-heading system showing the orifice therein, with the sliding blind in an opened position.

FIGS. 4 and 5 illustrate a top view and a perspective view, respectively, of coke drum de-heading system 10. Specifically, de-header valve 12 comprises a body 46 having an orifice 98 surrounded by a flanged portion 42 used to couple the de-header valve 12 to coke drum 18. Also shown is upper seat 34, which is a dynamic, live loaded seat contained within flanged portion 42. Although not shown in FIG. 4, de-header valve 12 comprises a lower static seat 38. Upper seat 34 and lower seat 38 serve to balance or support blind 106 as it moves or slides in a bi-directional manner through de-header valve 12. Blind 106 is shown in FIG. 4 as comprising a flat surface 108 and an orifice 110 adjacent flat surface 108. Essentially, blind 106 moves laterally within coke drum de-heading system 10 to open and close de-header valve 12. In a closed position, blind 106 is actuated and slid between upper seat 34 and lower seat 38, such that flat surface 108 completely blocks the opening in coke drum 18. In this closed position, coke drum 18 is ready to receive inlet feed 26, wherein coke drum 18 is filled with the petroleum byproduct, or resid, used to manufacture coke. Blind 106 is a dual seated blind, meaning that it is supported on either side from opposing or counteracting upper and lower seats 34 and 38, respectively. In addition, since upper seat 34 (or lower seat 38 in an alternative embodiment) is a dynamic, live loaded seat having adjustable properties, blind 106 is a "floating" blind in the sense that it is biased as a result of the biased nature of dynamic, live loaded upper seat 34.

Upon actuation of actuator 62 and ram 114 coupled thereto and to blind 106, blind 106 is caused to slide substantially laterally in a bi-directional manner between upper seat 34 and lower seat 38 into an open or partially open position, such that orifice 110 is brought into alignment with orifice 98 of de-header valve 12, which in turn causes alignment with the opening in coke drum 18. In this position, coke drum 18 may be decoked, or purged of its contents using traditional or commonly known methods. As such, flat surface 108 of blind 106 is retracted out of the way as blind 106 is slid in a substantially lateral manner in order to bring orifice 110 into proper alignment. Therefore, by sliding blind 106 back and forth, de-header valve 12 is opened and closed as needed. Blind 106 may be said to comprise a stroke having a distance long enough, such that blind 106 may close and seal de-header valve 12 using flat surface 108, and open de-header valve 12 when orifice 110 is properly aligned with orifice 98 and the opening in coke drum 18. The interim stages when blind 106 is moving from a closed position to an open position represents a critical aspect of the present invention as it is during these stages that the coke drum de-heading system performs the process of "de-heading" or "unheading" coke drum 18 in a significantly more effective and safe manner than prior art designs.

Figure 6:
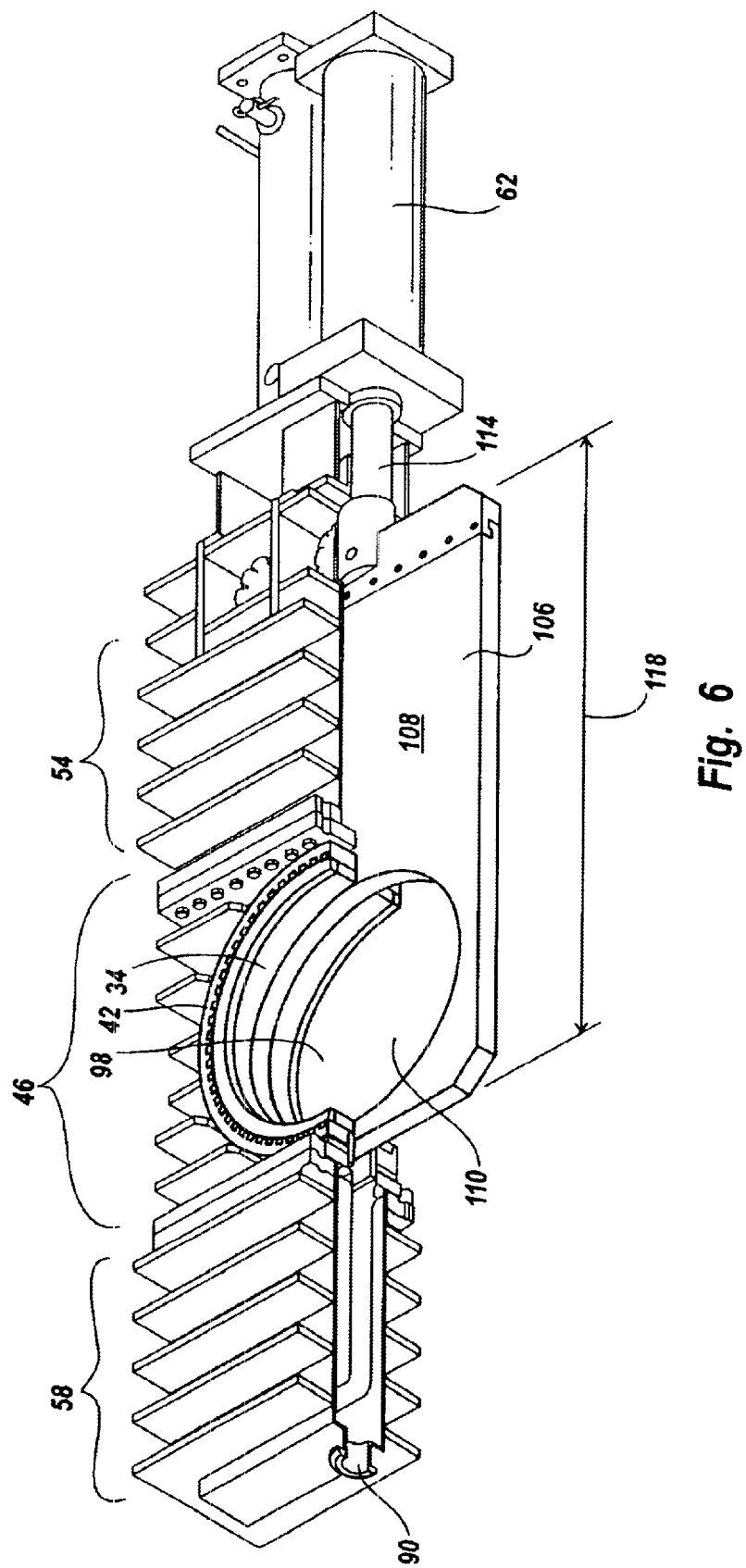
FIG. 6 illustrates a perspective cut-away view of the de-header valve of the coke drum de-heading system showing the relationship of the sliding blind to the de-header valve when the sliding blind is in an open position.
Figure 7:
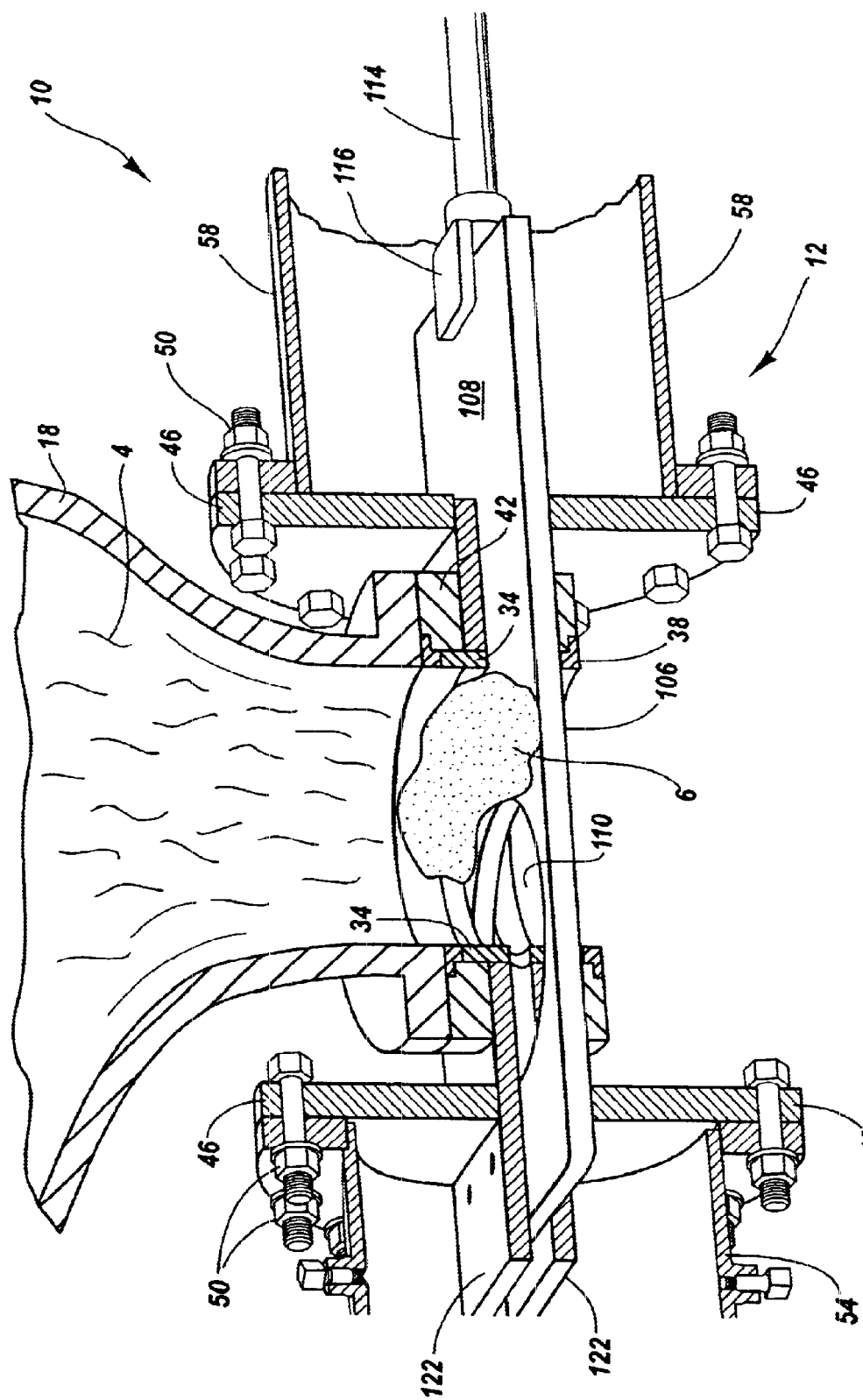
FIG. 7 illustrates a cut away view of the de-header valve attached to a coke drum containing coke, and specifically, the sliding blind in a partially opened position and its relationship and interaction with the de-header valve as it being used to de-head the coke drum.

FIGS. 6 and 7 illustrate the de-header valve of the present invention in an open an a partially open position, respectively. Actuator 62 controls ram 114, which couples to blind 106 via attachment means 116. Actuator 62 is preferably a hydraulic pump capable of producing the required forces to slide blind 106 in its substantially lateral manner within de-heading system 10. As discussed, blind 106 is supported on either side by upper seat 34 and lower seat 38, one of which is a floating dynamic, live loaded seat. As a result, and due to the nature of the coke manufacturing process in which the system is under extreme temperature and pressure, a large force must be applied to blind 106 from upper and lower seats 34 and 38, such that the system is substantially sealed and the pressure within the system maintained. Due to the existence of a dynamic, live loaded seat, de-header valve 12, and particularly the dynamic, live loaded seat, is capable of modulating any bowing in blind 106 that may exist during the coking process. In a normal coking process, extreme temperatures and pressures are present. Any variation in temperature between the upper and lower surfaces of the blind can cause the blind to bow. If the bowing is allowed to progress or continue, there is a danger in breaking the seal created between upper and lower seats 34 sand 38 and blind 106, which could cause damage to the system and upset the manufacturing process. However, the ability of the present invention to adjust the load exerted on blind 106, utilizing the dynamic, live loaded seat and its adjustment mechanism, provides a way to compensate for or modulate any existing bowing that might occur. By increasing the applied load of the dynamic, live loaded seat on blind 106, the bowing is substantially eliminated, thus returning blind 106 to a more natural shape.

In order to move blind 106, actuator 62 must be comprised of sufficient strength so as to be able to overcome this initial seal and provide the necessary force to slide blind 106 back and forth between an open and closed position. One ordinarily skilled in the art will recognize that other types of devices or systems may be used, other than a hydraulic pump, to actuate blind 106 and to overcome the forces exerted on blind 106 by upper seat 34 and lower seat 38, thus this should not be limiting in any way.

FIG. 7 illustrates coke drum 18 as it is coupled to and sealed to de-header valve 12. Specifically, the flanged portions of each are coupled together using commonly known means, such as a bolted connection. FIG. 7 is primarily used to illustrate blind 106, having orifice 110 and flat surface 108, and its purpose in de-heading coke drum 18. De-header valve 12 is shown in a partially open position. In a closed position, flat surface 108 would align with orifice 98 and the opening of coke drum 18, such that the system, and particularly coke drum 18, would be ready to receive the resid by-product through feed inlet 26. Blind 106 has an end portion that settles into a blind shroud 122 when de-header valve 12 is closed.

Coke drum 18 is also cut away to show the presence of coke 4 therein, and particularly coke head 6 and its relative position within system 10. During the manufacturing process, resid is pumped into coke drum 18, thereby ultimately producing coke 4 that is contained within coke drum 18. In the beginning stages when coke drum 18 is being filled with resid, a large portion will naturally accumulate at the bottom of the drum and on flat surface 108, thus forming a "head" near the opening of de-header valve 12. This accumulation causes flat surface 108 of blind 106 to be caked with coke. As the resid sets up and coke is formed, this "head" must be removed in order to decoke the entire drum and purge the drum of the coke bed contained therein. This is essentially done by the present invention by sliding blind 106 from a closed position to an open position. As can be seen in FIG. 7, blind 106 is supported by upper and lower seats 34 and 38. Not only is blind 106 supported, but rather large forces are applied to blind 106 through these seats in order to enable a suitable pressurized environment. As such, the tolerances between upper and lower seats 34 and 38 and blind 106 are extremely tight. Because of these tight tolerances, and the accumulation of coke 4 on flat surface 108, as blind 106 is displaced from its closed position, coke 4, and particularly coke head 6, is sheared by upper seat 34 from off of flat surface 108. This shearing effect breaks up the coke that has accumulated on blind 106, thus essentially de-heading coke drum 18, wherein coke drum 18 is prepared for the decoking process.

As a result of the load exerted upon blind 106 and resulting tight tolerances existing between blind 106 and upper and lower seats 34 and 38, the substantially lateral bidirectional movement of blind 106 between upper and lower seats 34 and 38 causes a grinding and polishing effect to occur. In a preferred embodiment, upper and lower seats 34 and 38, as well as blind 106 are made of metal, thus providing a metal to metal contact or metal to metal seal, or otherwise referred to as metal to metal seating of blind 106. This metal to metal seating is a unique aspect of the present invention in relation to coke drum de-heading. The metal to metal seating increases the durability of the system as there are no non-metal parts, such as vinyl or rubber, used to seal the seats to blind 106. Metal to metal seating allows the system to achieve a higher consistency of sealing, while at the same time providing extended wear and durability. In addition, the metal to metal sealing allows the system, and specifically the sealing within the system, to be fine-tuned as discussed below.

Upper seat 34 and lower seat 38 are independent of one another and provide definitive double block and bleed/double block and purge capabilities.

A further feature of the present invention is the enclosure of the seating used to seal the system. Upper seat 34 and lower seat 38 are completely protected from the flow of material passing through orifice 98, such that they are not in the direct line of flow. As such, there is a decreased chance of erosion to the finish of upper and lower seats 34 and 38, as well as decreased erosion potential. This becomes critical in that the present invention allows for fine-tuning of upper and lower seats 34 and 38 to more directly and precisely control sealing on a point to point basis against blind 106.

As a result of this type of seating, the metal to metal contact coupled with the lateral bidirectional movement of blind 106 and the tight tolerances existing therein effectuates this polishing. This polishing effect over time provides for much smoother transitions of blind 106 between an open and closed position. In other words, the force required to displace blind 106 becomes less and less over time due to the smooth, polished metal to metal contact between upper and lower seats 34 and 38 and blind 106. In addition to the metal to metal contact, upper and lower seats 34 and 38 may be finished, such as with a hardened chrome. Blind 106 may also be finished, such as with a nitride coating that is integrated into the molecular structure of blind 106. Providing a finish to these elements creates significant advantages, such as increased wear, thus prolonging their replacement, and increasing performance while in operation.

Figure 8:
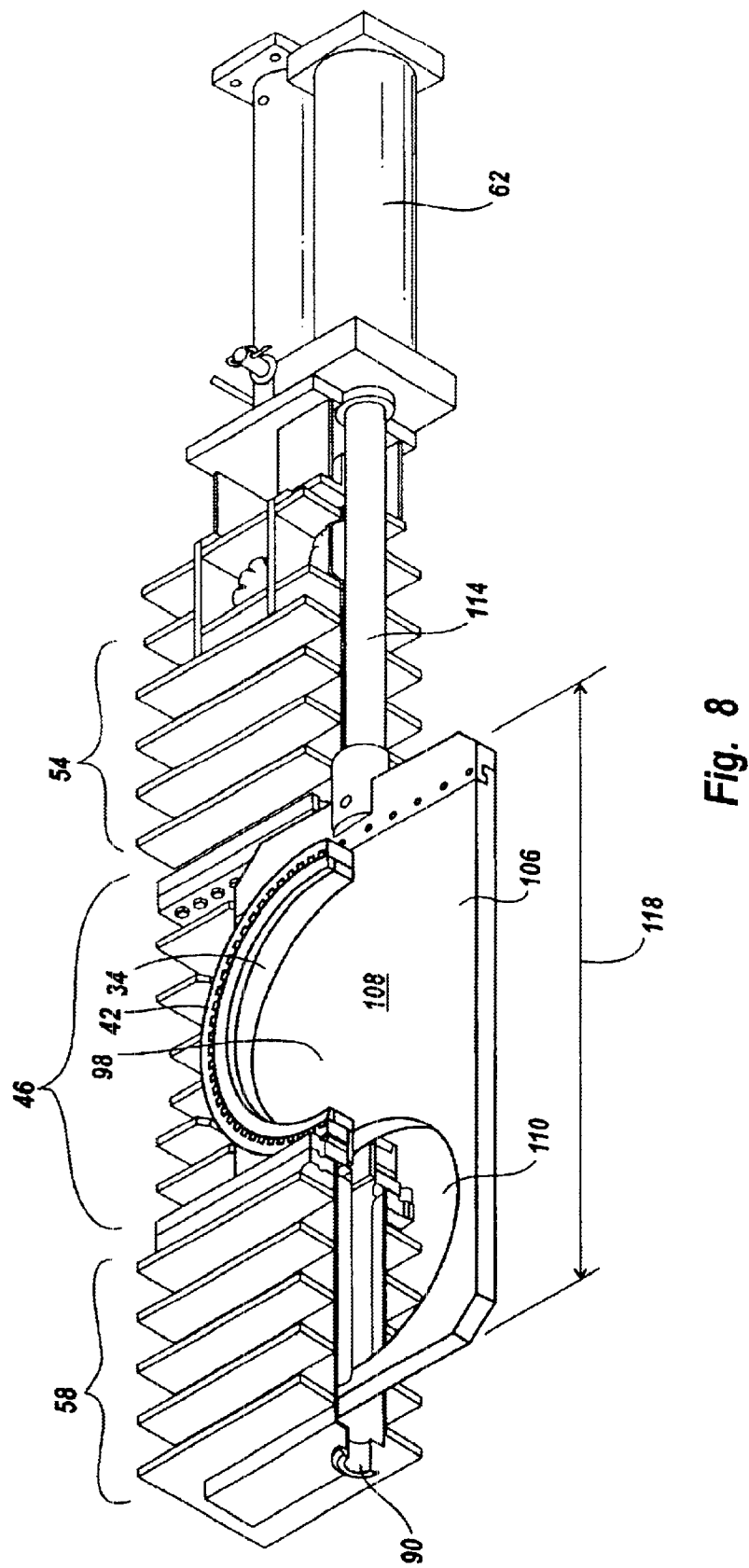
FIG. 8 illustrates a perspective cut-away view of the de-header valve of the coke drum de-heading system showing the relationship of the sliding blind to the de-header valve when the sliding blind is in a closed position.
Figure 9:
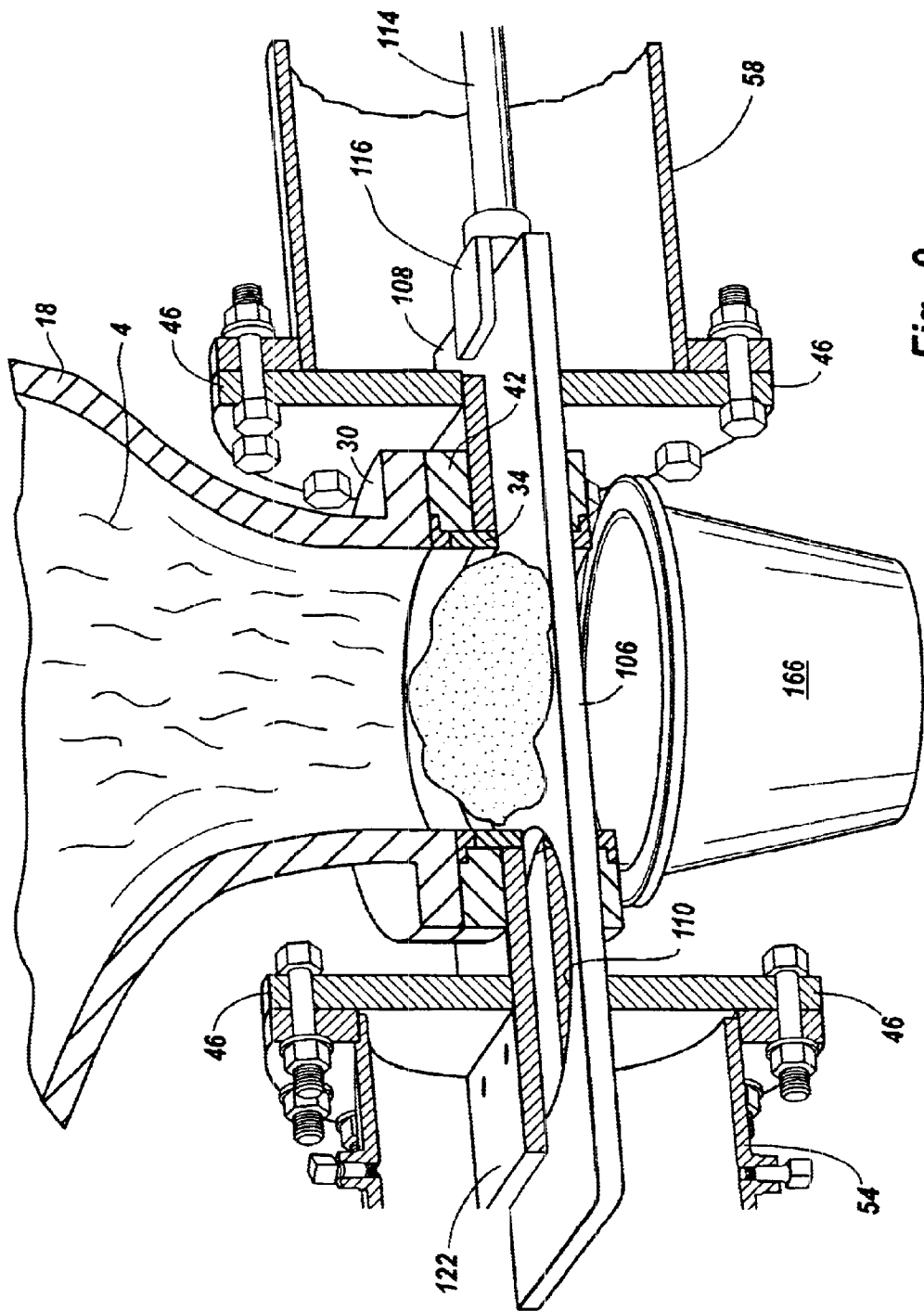
FIG. 9 illustrates an enlarged cut-away sectional view of the de-header valve as it is attached to a coke drum containing manufactured coke, and particularly, the de-header valve with the sliding blind in a substantially closed position where coke accumulates on the surface of the sliding blind during the coking process.
Figure 10:
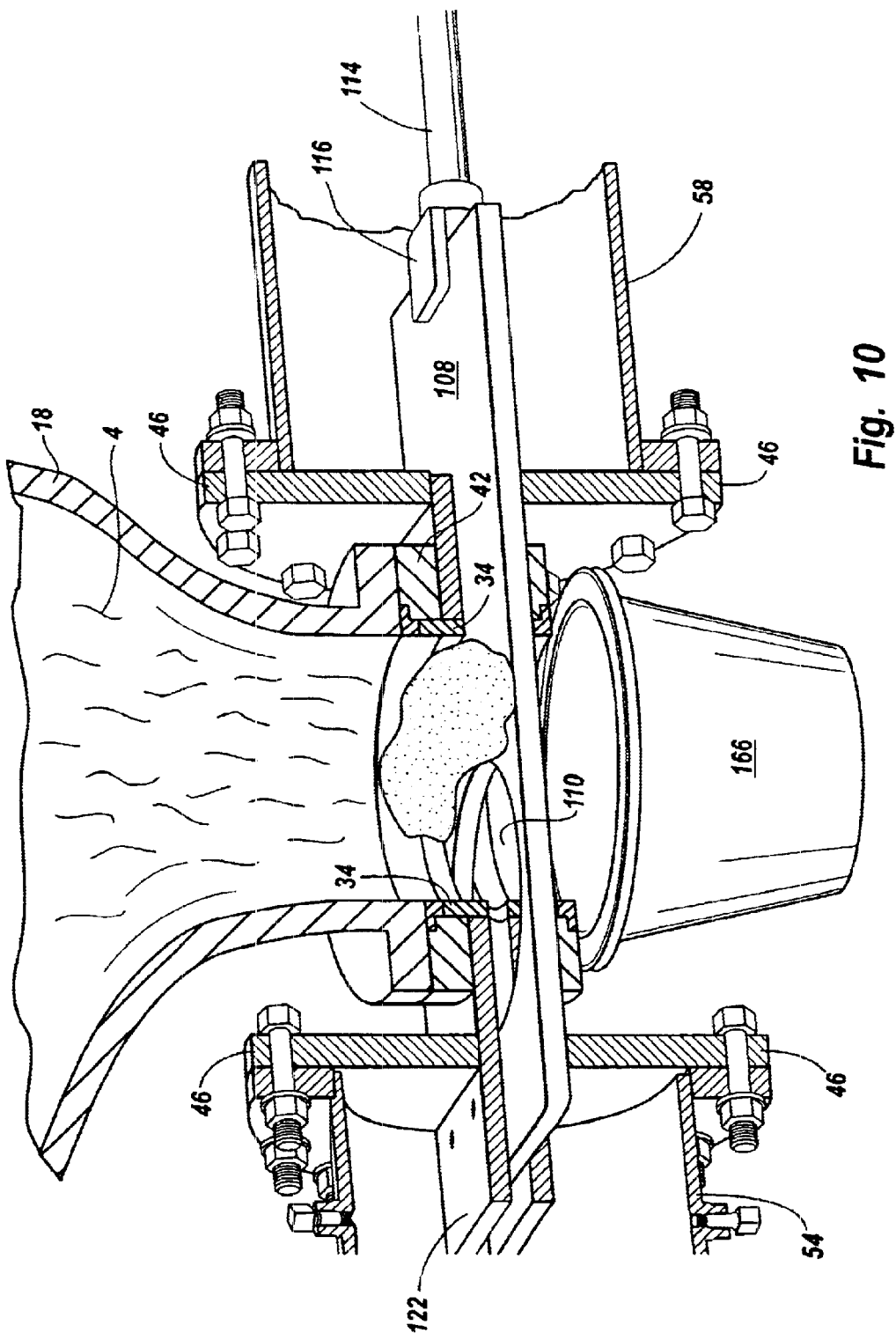
FIG. 10 illustrates an enlarged cut-away sectional view of the de-header valve as it is attached to a coke drum containing manufactured coke, and particularly, the de-header valve with the sliding blind in a partially opened position as it is being used to de-head the coke drum.

FIGS. 8–10 show de-header valve 12, and particularly blind 106, as it progresses from a closed position (FIG. 8) to a substantially closed position or partially open position (FIG. 9) to a substantially open position (FIG. 10), thus representing the interim stages when blind 106 is being slid laterally, thus causing coke drum 18 to essentially be "de-headed." As blind 106 is closed, coke 4 accumulates on flat surface 108 of blind 106, such that blind 106 is caked with coke. Once coke drum 18 is full, feed inlet 26 is switched off or routed to a second coke drum. After the pre-coking steps are performed, the coke drum must be de-headed in order to allow the rest of the coke bed contained within the drum to be removed using standard procedures. To de-head coke drum 18, an operator simply actuates actuator 62 from some location remote from the coking site, thus causing blind 106 to begin to move laterally in a bi-directional manner within de-header valve 12. As actuator 62 is initially activated, a large force is required to move blind 106 due to the seal between blind 106 and upper and lower seats 34 and 38 that must be broken and the initial shearing of coke 4 that has accumulated on flat surface 108 of blind 106. FIG. 9 shows how coke 4 begins to break free and build up along the inside edge of upper seat 34 as blind 106 is displaced. As blind 106 is displaced further, more coke 4 is freed and builds up. In addition, as orifice 110 is brought into alignment, that portion of coke 4 that has broken free is allowed to drop through orifice 98 of de-header valve 12 into catch basin 166. Catch basin 166 may be any mown device or system known in the art, such as a rail cart, etc.

FIG. 10 shows blind 106 in a more partially opened position. As can be seen, coke 4, and particularly coke head 6, is sheared from flat surface 108 of blind 106 the more blind 106 is opened. The lateral displacement of blind 106 from a closed to an opened position serves to de-head coke drum 18. The tight tolerance between upper and lower seats 34 and 38 and blind 106 are such that coke 4 is not allowed to pass under upper seat 34, but is sheared off and contained within the seat boundaries. Coke 4 should not pass under upper seat 34 as blind 106 is being opened as this would damage the polished surfaces being attained by the bi-directional movement of blind 106 between upper and lower seats 34 and 38. Once opened, de-header valve 12 is not required to be removed from coke drum 18 prior to decoking the entire drum. Essentially, workers may decoke coke drum 18 using standard procedures. Once finished, the operator simply deactivates actuator 62, such that blind 106 returns to a closed position, whereby coke drum 18 may again be filled with resid and put through the identical process. A great advantage of the present invention, among others, is that there is only one main moving part (blind 106) used to de-head the coke drum and that this part is entirely enclosed within a valve that may be attached to the coke drum without having to be removed after each consecutive cycle.

During the initial stages of coking, when the blind (or gate) is in its closed position and the de-header valve is ready to receive resid or manufactured coke, the blind surfaces will distort due to uneven heat distribution throughout the thickness of the blind that are caused from the intense heat and pressure within the coke drum and system. During the coking process, the live loaded, all metal floating seat is designed to articulate axially while elastically forming to the surface of the blind, thus maintaining a uniform load and contact between the entire perimeter of the seat and the gate. This is accomplished several ways.

First, the section modulus and moment of inertia of the floating seat is calculated to allow the seat to elastically deform broadly over it's perimeter while remaining effectively rigid between centers of the loading points which energize against the blind. Second, the dynamic, live loaded seat represents the floating seat concept, wherein the dynamic, live loaded seat is continuously loaded against the blind, meaning that the seat may fluctuate and adjust as needed to maintain a proper seal within the system and to provide the necessary forces needed to maintain the integrity of the blind and a uniform load on the blind. This floating seat concept may be accomplished using several configurations and materials. The following paragraphs discuss this concept in detail. However, one ordinarily skilled in the art will recognize the possible alternatives to the specific assemblies described below and shown in the drawings.

FIGS. 11–15 represent the live loaded seat concept as applied to the coke drum de-heading system 10, and specifically the de-header valve 12, of the present invention. FIG. 11 illustrates de-header valve 12 having a live loaded seat assembly 132 and a static seat assembly 136. Other embodiments may comprise a de-header valve having multiple live loaded seat assemblies, such as an upper and lower live loaded seat assembly.

Live loaded seat assembly 132 is comprised of a floating dynamic, live loaded seat, shown as upper seat 34, and at least one, and preferably four, live seat adjustment mechanism(s) 134 used to adjust and control the load exerted by dynamic, live loaded seat upon flat surface 108 of blind 106. One ordinarily skilled in the art will recognize that dynamic, live loaded seat may be positioned as upper seat 34 or lower seat 38. Live loaded seat assembly 132 further comprises a force transfer module 162, shown in FIG. 11 as a wedged member, whose primary purpose is to transfer the load exerted by live seat adjustment mechanism 134 to the dynamic, live loaded seat, which in turn exerts a resulting force upon flat surface 108 of blind 106. Force transfer module 162, or wedged member, is constructed having an angled section, which corresponds directly with a matching angled portion on the dynamic, live loaded seat.

FIG. 11 also shows seat retaining rings 126, whose function is to secure and hold upper seat 34 in place within de-header valve 12. Seat retaining rings 126 are securely coupled to de-header valve 12, using any number and orientation as necessary. Seat retaining rings 126 must be securely fastened so as to remain in a fixed position at all times. As shown, upper seat 34 exists as the dynamic, live loaded seat described herein. Lower seat 38, which is shown as a static seat, also is secured and held in place by a lower seat retaining ring similar to that as an upper seat retaining ring. Each of the seat retaining rings used in de-header valve 12 are coupled to de-header valve 12 using fastening means 130, which are commonly known in the art.

FIG. 11 also provides an illustrative view of blind 106 and its relationship with upper seat 34 and lower seat 38. In essence, blind 106 comprises a dual-seated linear motion blind having near zero tolerances existing between each of the upper and lower seats and the upper and lower surfaces of blind 106. Such tolerances are necessary to maintain a suitable pressurized environment during the manufacturing process. As mentioned above, upper and lower seats 34 and 38 provide a metal to metal contact with blind 106 such that a seal is created within de-header valve 12. This seal is important as there is a greater load between the seat and the gate, than the bun strength or load in coke drum 18. This seal enables de-header valve 12 to maintain a suitable pressurized environment during the coke manufacturing process and is attained by the load exerted on blind 106 through dynamic, live-loaded seat 34.

Figure 13:
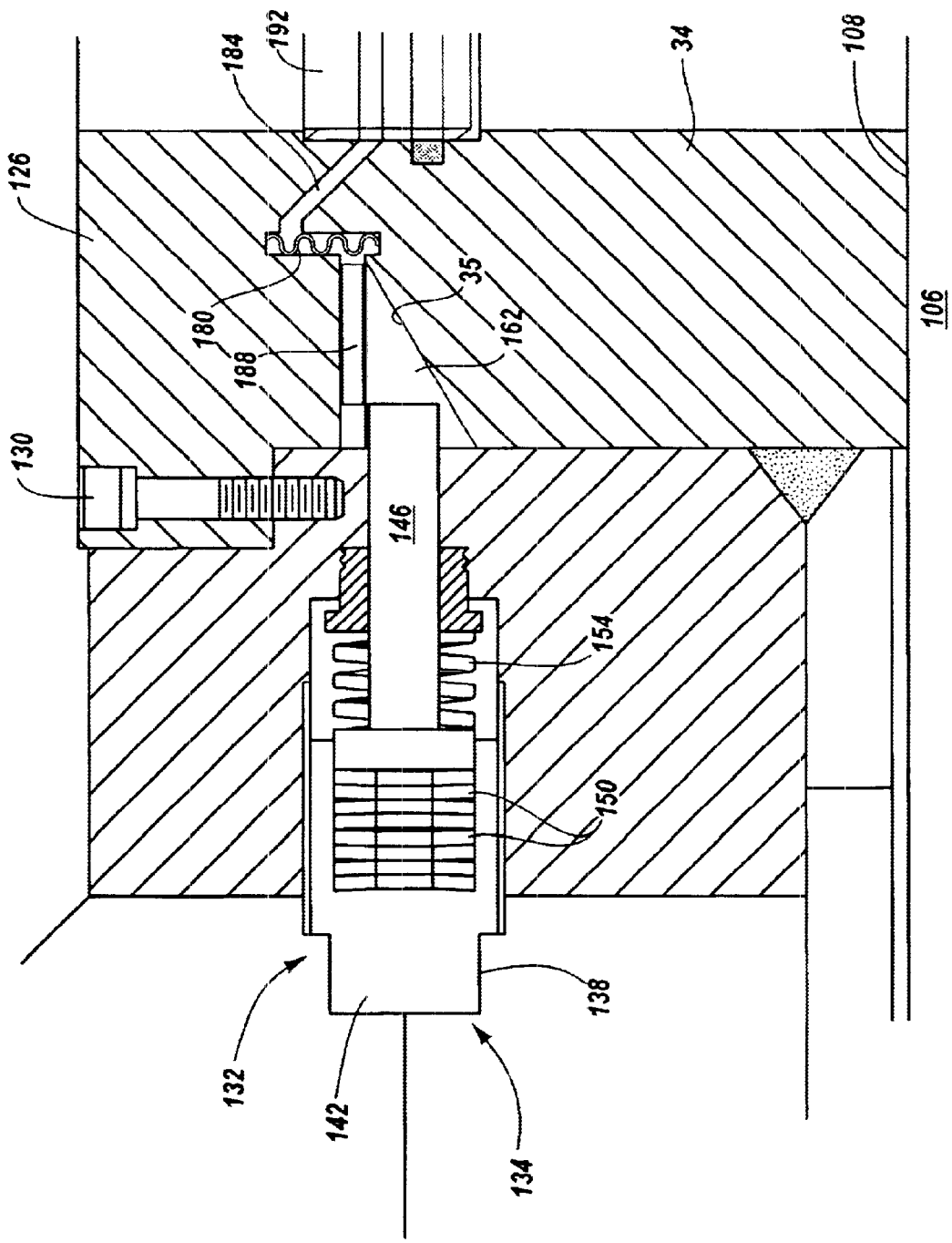
FIG. 13 illustrates one embodiment of the dynamic, live loaded seat and live seat adjustment mechanism.

FIG. 12 illustrates an enlarged view of live-loaded seat assembly 132 as shown in FIG. 11. Live-loaded seat assembly 132 comprises live seat adjustment mechanism 134, force transfer module 162, working to interact with dynamic live-loaded seat, which is shown in FIG. 12 as upper seat 34. Each of these elements works in conjunction with one another to apply and transfer force to blind 106, thus creating the necessary seal and de-heading functions as earlier described. Live seat adjustment mechanism 134 itself comprises housing 138, which houses and holds the elements of live seat adjustment mechanism 134. Specifically, housing 138 has contained therein a force applicator 142 that may be mechanically or manually adjusted depending on the amount and degree of force needed. In a preferred embodiment as shown in FIG. 13, force applicator 142 is simply a threaded member that may be rotated to increase or decrease the load on blind 106. Force applicator 142 is adjacent to and in contact with biased plunger 146. Biased plunger 146 has distal and proximate ends with the distal end being in direct contact with force transfer module 162. As force applicator 142 is activated to increase or decrease the load exerted on blind 106, biased plunger 147 is driven into force transfer module 162, which in turn exerts a resulting force on the dynamic love-loaded seat, or upper seat 34 as shown in FIG. 10, which in turn causes a resulting force to be exerted upon blind 106 at contact 36. As mentioned, seat retaining rings 126 are securely fixed and will not move, thus allowing wedged portion (force transfer module 162), which abuts seat retaining ring 126, to transfer force directly to blind 106 through the dynamic, live loaded seat. The force applied by dynamic, live loaded seat to blind 106 is directly proportional to the force applied by force applicator 142. Thus, to increase the load on blind 106, the operator simply activates force applicator 142. To decrease the load on blind 106, the operator simply deactivates force applicator 142. Force applicator 142 is coupled to de-header valve 12 such that it may be cycled in and out to adjust the pressure or force exerted on blind 106.

Force applicator 142 may be adjustable via manual means, such as a threaded bolt as shown, or via hydraulic or pneumatic means. One ordinarily skilled in the art will recognize the possible ways to apply pressure to force transfer module 162, while maintaining a seal. In addition, load bearing members may also be comprised of any suitable means capable of bearing a biased load and creating a loaded tension force upon force transfer module 162 and the dynamic, live loaded seat.

The dynamic, live-loaded seat of the present invention is a biased or floating seat, thus allowing a degree of longitudinal fluctuation of blind 106 both during the manufacturing process when coke drum 18 is being filled, as well as when actuator 62 is activated or deactivated to cause blind 106 to move from a closed position to an open position. Moreover, dynamic, live loaded seat 34 compensates for thermal expansion and thermal distortion of blind 106 during the coking cycle. This is because during initial stages of coking, the surfaces of blind 106 will distort due to uneven heat distribution throughout the thickness of blind 106. Therefore, dynamic, live loaded seat 34 is allowed to articulate axially and transversely as well as to conform to the camber of blind 106 at maximum differential temperature. This feature assures an uninterrupted seal across the de-header valve at all times.

The biasing effect of the dynamic live-loaded seat results from the configuration of live seat adjustment mechanism 134. Specifically, in one embodiment, live seat adjustment mechanism 134 comprises a series of biasing elements or load bearing members 150, such as Bellevue washers and springs 154 that act in conjunction with plunger 146. By biasing the dynamic live-loaded seat, any physical variations or deflections in blind 106 during the manufacturing process or the de-coking process will be absorbed through live-loaded seat assembly 132. This provides a significant advantage as it is not uncommon for blind 106 to go through various stages of deflection as a result of either pressure and/or temperature differentials. The biased nature of the dynamic live-loaded seat will allow de-header valve 12 to maintain a workable pressurized environment as well as to account for any physical or structural changes to de-header valve 12 as a result of the intense environment existing in the manufacturing process.

Although not specifically shown, the present invention utilizes independent point loading zones to adjust and control the movement floating dynamic, live loaded seat. Preferably, there are four loading zones, each having its own independent live seat adjustment mechanism and force transfer setup. These live seat adjustment mechanisms are preferably arrayed, in an equidistant, at quadrants around the floating dynamic, live loaded seat and each comprise various adjustment and force applying means (such as the various embodiments described herein). Independent loading zones are advantageous in that they provide and allow for precise point to point adjustability to the dynamic, live loaded or floating seat within each of the loading zones. Specifically, these four loading zones significantly increase the ability to efficiently adjust and manipulate the de-heading system, and particularly the floating or dynamic, live loaded seat, according to the pressure and other extraneous conditions experienced within the system, as well as to account for and remove potential areas of breach where leaking may occur. These loading zones and independent points of adjustability also allow the use of components that are as true or smooth as would be required in conventional static seals. Each of the four loading zones provide such precise control, that they could even be adjusted to the point where such an extreme amount of force is applied to the blind such that the blind is no longer moveable by the actuator. By allowing point to point adjustability by independent setups, the de-header system of the present invention is capable of being fine tuned to decrease the chances of unwanted and potential breaches within the system. For example, if the system were leaking at one location, any one of, or multiple, live seat adjustment mechanisms could be adjusted to compensate for and seal the leak.

FIG. 13 is illustrative of another embodiment of the live-loaded seat assembly 132. Live-loaded seat assembly 132 comprises live seat adjustment mechanism 134, force transfer module 162, and a dynamic live-loaded seat 34. As in the first embodiment, each of these elements works in conjunction with one another to apply and transfer force to surface 108 of blind 106, thus creating the necessary seal and de-heading function as earlier described. This embodiment comprises similar elements and similar functions as those shown and described in FIG. 12. However, this embodiment further comprises a full perimeter flexible inconnel bellow seal spring 180 placed between floating dynamic, live loaded seat 34 and seat retaining ring 126. This spring serves to provide process pressure assisted loading, which occurs as the process pressure within the system inflates the bellow seal spring and adds to the forces loading dynamic, live loaded seat and applying force to the blind. These springs also serve as a pressure barrier to prevent any process fluid from entering live loaded seat assembly 132 at the four loading zones as this would cause damage to the operation of assembly 132 and breach the integrity of the system.

Figure 14:
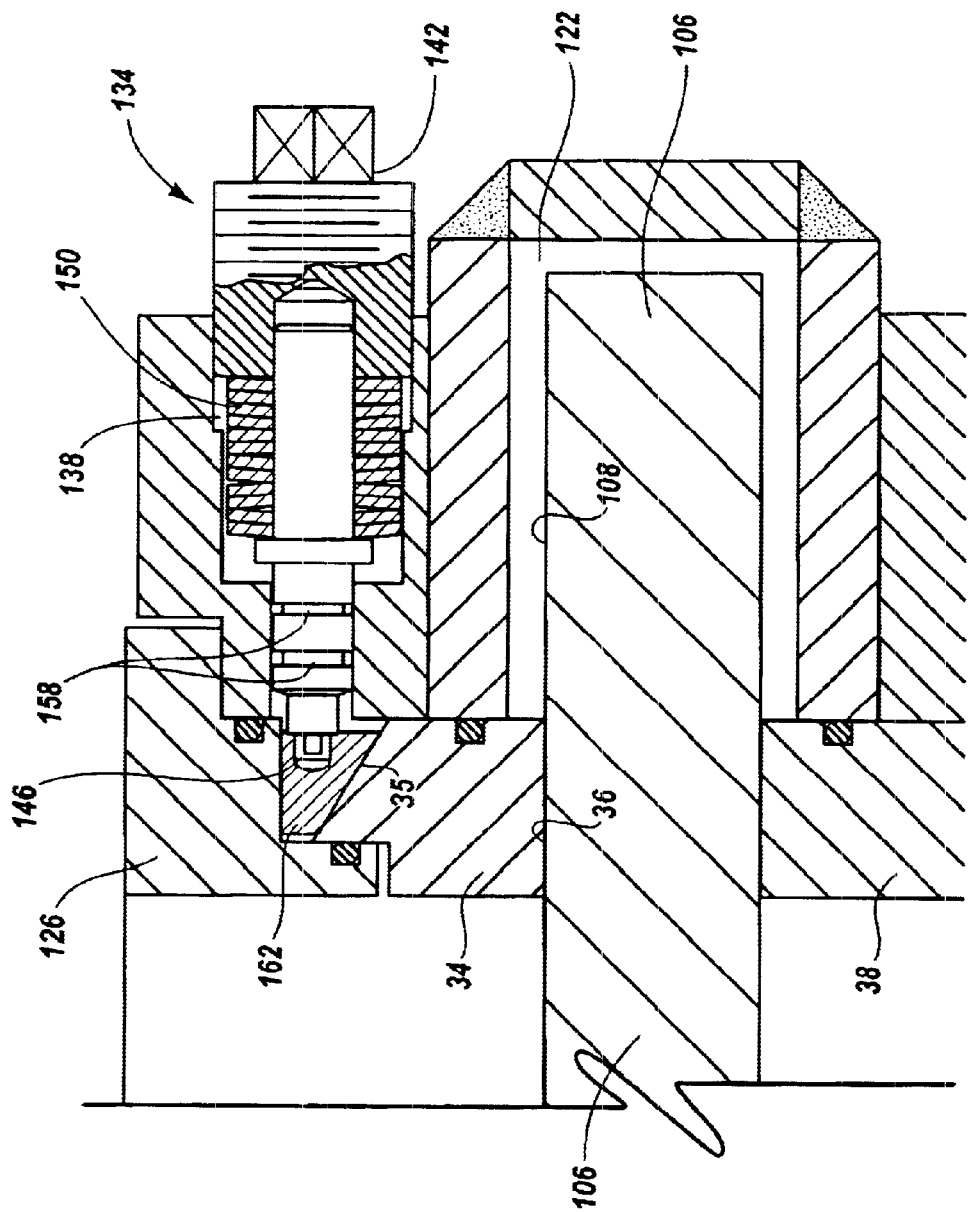
FIG. 14 illustrates an alternative embodiment of the dynamic, live loaded seat and live seat adjustment mechanism.

FIG. 14 is illustrative of an alternative embodiment of live-loaded seat assembly 132. Specifically, this embodiment comprises a series of o-rings 158 that are in place and utilized to help seal the system against leaks. Again, this embodiment comprises similar features and functions as those described in FIG. 12, including force applicator 142, that may be used to increase pressure on force transfer module 162, which in turn exerts a proper pressure or force on the dynamic, live loaded seat, shown in FIG. 14 as upper seat 34.

Figure 15:
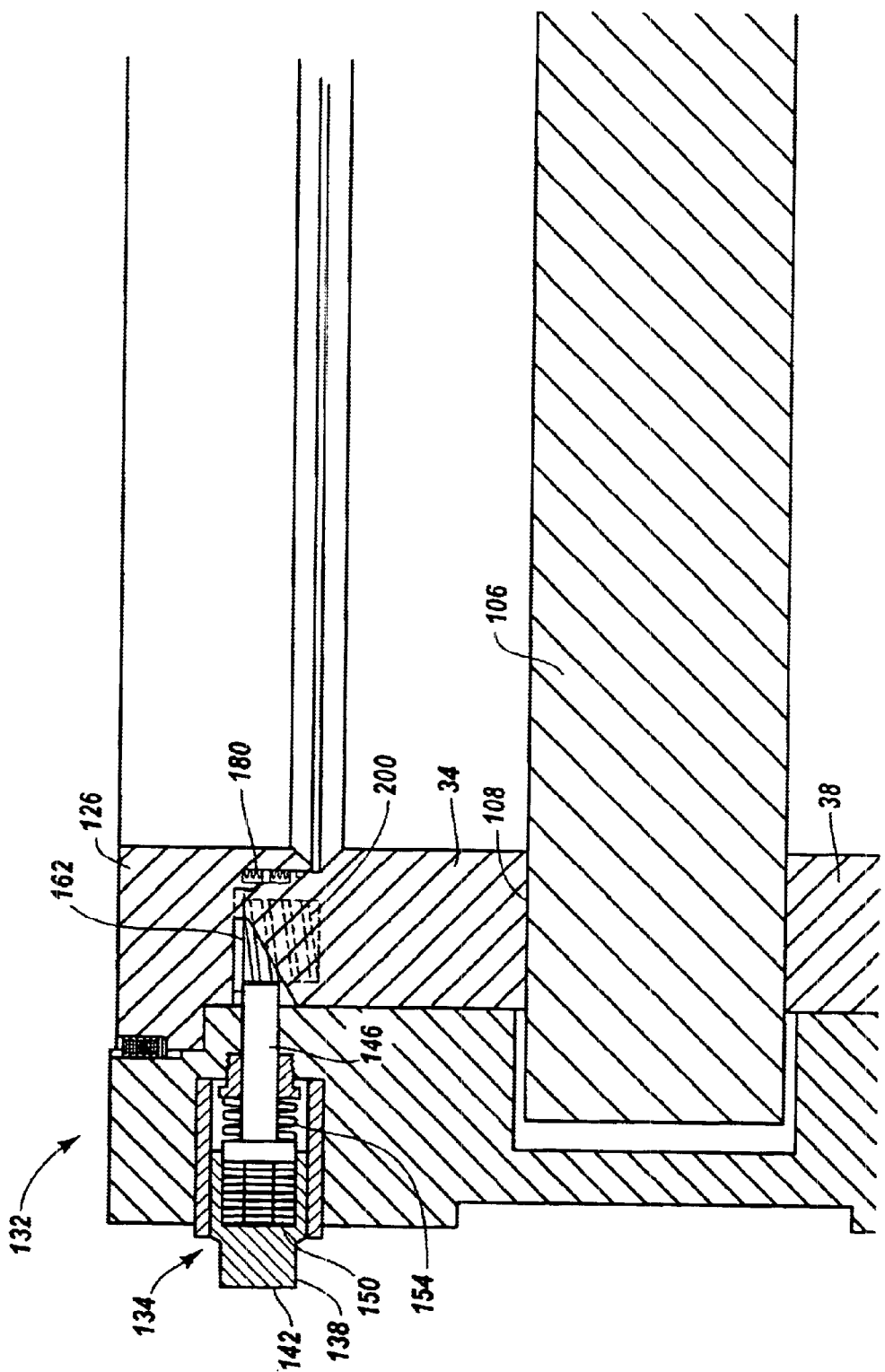
FIG. 15 illustrates an alternative embodiment of the dynamic, live loaded seat and live seat adjustment mechanism, and specifically, the floating seat concept wherein the seat itself is biased.

Finally, FIG. 15 illustrates yet another embodiment of the live loaded seat concept. Specifically, in this embodiment, live-loaded seat assembly 132 comprises heavy coil springs 200 arrayed at close centers around the perimeter of seat retaining ring 126. Coil springs 200 are specifically designed to provide a floating aspect to dynamic, live loaded seat 34. The advantages of the present invention are realized in the floating seat concept a taught herein. This advantage is carried out in this embodiment by biasing dynamic, live loaded seat 34 with coil springs 200. Specifically, dynamic, live loaded seat 34 is continuously loaded by applying an initial bias to dynamic, live loaded seat 34, through coil springs 200, which allows dynamic, live loaded seat 34 to essentially "float" between coil springs 200 and blind 106. It should be noted that coil springs 200 serve to operate in conjunction with the other elements and functions of live loaded seat assembly 132, which are similar in concept and operation to those discussed in FIG. 12, which elements also provide biasing characteristics to allow dynamic, live loaded seat 34 to "float."

Of course, one ordinarily skilled in the art will recognize the many types of biasing assemblies and or devices that may be used in place of coil springs 200. For example, coil springs 200 could be replaced with a flexible bladder that may be specifically controlled to bias dynamic, live loaded seat 34.

In addition to the above-described and illustrated features, the system of the present invention functions to control pressure within the system and to prevent leakage into unwanted areas of the system, thus providing for positive isolation. This isolation is accomplished through the use of close tolerances in the metal to metal seating, and resulting sealing. O-rings may also used to improve sealing. In addition, a positive pressure may be introduced from the outside of the valve to prevent venting of the feed stream to atmosphere or into parts of the valve. The system provides for remote verification of positive isolation. This means that steam may be added to the steam purge inlet to pressurize the valve system outside of the sealed area. This pressure may be used to isolate the feed stream which is at a lower pressure, or it may be used to check the efficiency of the seals. The system is designed to allow remote monitoring of this isolation pressure to verify that the system is not leaking contaminants to atmosphere.

The system, and specifically the dual independent seats, also provides definitive double block and bleed/purge capabilities as well as instant and remote live switching to double block and vent mode from double block and purge mode on loss of purge steam. The metal to metal seal between the gate and the upper and lower seats provide one method of blocking leakage, along with the pressure from the outside of the seals which isolates the feed stream if the pressure is greater outside of the seal. If pressure is leaking, the system may be adjusted in one of the many ways described above to compensate for and stop the leak. In addition, the o-rings may be replaced to increase the integrity of the system.

The present invention also features a method for de-heading a coke drum following the manufacture of coke therein. The method comprises the steps of: (a) obtaining at least one coke drum designed for the manufacture of coke; (b) equipping the coke drum with a de-header valve, the de-header valve being removably coupled to the coke drum and itself comprising 1) a main body having means for connecting the de-header valve to the coke drum; 2) an adjustable dynamic, live loaded seat coupled to the main body; 3) a static seat coupled to the main body in an opposite or counteracting position to the dynamic, live loaded seat; and 4) a blind coupled to the main body and activated by an actuator, wherein the blind is capable of moving in a substantially lateral bi-directional manner within the de-header valve between the upper and lower seats to control the opening and closing of the de-header valve, and the blind providing a seal between the dynamic, live loaded seat and the static seat; (c) closing the blind and sealing the dynamic, live loaded seat against the blind so as to seal the de-header valve; (d) manufacturing coke from a refinery process; and (e) de-heading the coke drum by actuating the blind and causing it to slide across the dynamic, live loaded seat and static seat into an open position, the dynamic, live loaded seat and static seat thus shearing the coke in the coke drum as the blind is displaced. This method may be utilized on either a bottom or top de-heading system.

The present invention may be embodied in other specific forms without departing from its spirit of essential characteristics. The described embodiments are to be considered in all respects only al illustrative and not restrictive. The scope of the invention is, therefore, indicated by the appended claims, rather than by the foregoing description. All changes which come within the meaning and range of equivalency of the claims are to be embraced within their scope

What is claimed is:

1. A coke drum de-heading system comprising:
   a coke drum having an opening therein, said coke drum receiving coke therein from a manufacturing system and process;
   a de-header valve removably coupled to said opening of said coke drum to facilitate removal of coke from said coke drum, said de-header valve comprising:
   (1) a main body having an orifice dimensioned to align with said opening of said coke drum when the de-header valve is coupled thereto;
   (2) a live loaded seat assembly coupled to said main body and comprising a dynamic, live loaded seat; at least one live seat adjustment mechanism coupled to said main body and designed to control and adjust the force and resulting seat load of said dynamic, live loaded seat, and a force transfer module in juxtaposition to said dynamic, live loaded seat for transferring the force from said live loaded seat adjustment mechanism to said dynamic, live loaded seat;
   (3) a static seat assembly comprising a static seat positioned opposite from and designed to counteract or counterbalance said dynamic, live loaded seat; and
   (4) a sliding blind movable in a manner within said de-header valve and between said dynamic, live loaded seat and said static seat, said blind physically controlled by an actuator and having a force exerted thereon by said dynamic, live loaded seat and said static seat, such that a seal is created between said dynamic, live loaded seat, said blind, and said static seat, said blind capable of repeated and automatic de-heading and re-heading of said coke drum,
   wherein said movement of said sliding blind serves to open and close said de-header valve, and wherein said movement of said sliding blind from a closed to an open position serves to de-head said coke drum.

2. The coke drum de-heading system of claim 1, wherein said sliding blind is a dual-seated, linear motion, metal to metal sealed isolation device, and specifically a fully enclosed, hydraulically powered, double sealed and pressurized linear goggle blind.

3. The coke drum de-heading system of claim 1, wherein said seal is created using metal to metal contact between said sliding blind and each of said seats.

4. The coke drum de-heading system of claim 1, wherein said live loaded seat assembly comprises four of said live seat adjustment mechanisms spaced in four equidistant quadrants around said dynamic, live loaded seat to provide precise point to point adjustability of said dynamic, live loaded seat.

5. The coke drum de-heading system of claim 1, wherein said dynamic, live loaded seat is a floating seat that allows and compensates for an identifiable degree of longitudinal fluctuation and deflection experienced by said sliding blind during said manufacturing process, as well as to articulate axially and transversely and conform to the camber of said sliding blind at maximum differential temperature.

6. The coke drum de-heading system of claim 5, wherein said at least one live seat adjustment mechanism further comprises a series of biasing load bearing members designed to provide the means for rendering said dynamic, live loaded seat a floating seat.

7. The coke drum de-heading system of claim 5, wherein said live loaded seat assembly further comprises coil springs arrayed at close centers around the perimeter of a seat retaining ring, said coil springs designed to provide the means for rendering said dynamic, live loaded seat a floating seat.

8. The coke drum de-heading system of claim 5, wherein said live loaded seat assembly further comprises a flexible bladder around the perimeter of a seat retaining ring, said flexible bladder designed to provide the means for rendering said dynamic, live loaded seat a floating seat.

9. The coke drum de-heading system of claim 1, wherein said de-header valve further comprises a full perimeter flexible inconnel bellow seal spring placed between said dynamic, live loaded seat and a seat retaining ring, said spring provides process pressure assisted loading, thus applying a force to said dynamic, live loaded seat and contributing to the force exerted by said dynamic, live loaded seat upon said sliding blind, as well as serving as a pressure barrier to prevent any fluids from entering said live loaded seat assembly.

10. The coke drum de-heading system of claim 1, wherein said live loaded seat assembly further comprises a series of o-rings therein to seal said live loaded seat assembly against leaks.

11. A coke drum de-heading valve comprising:
   a main body removably coupled to a coke drum, wherein said main body comprises an orifice dimensioned to align, in a concentric relationship, with an opening of said coke drum;
   a blind or sliding blind capable moving in a manner between an upper and lower seat that are each secured in place by respective seat rings, said sliding blind moving to open and close said de-header valve, said sliding blind and each of said seats creating a seal therebetween, said blind capable of repeated and automatic de-heading and re-heading of said coke drum without manual activity;
   a floating dynamic, live loaded seat comprising either of said upper and lower seats, said floating dynamic, live loaded seat is adjustably and continuously biased against said sliding blind using one or more biasing elements; and
   at least one live seat adjustment mechanism coupled to said main body for controlling the adjustability of said floating dynamic, live loaded seat,
   wherein said coke drum is de-headed as said sliding blind is relocated from a closed to an open position.

12. The coke drum de-heading valve of claim 11, wherein biasing element comprises heavy coil springs arrayed at close centers around a perimeter of said seat ring.

13. The coke drum de-heading valve of claim 11, wherein biasing element comprises four externally live loaded and sealed seat wedges arrayed at quadrants around said floating dynamic, live loaded seat.

14. The coke drum de-heading valve of claim 11, wherein biasing element comprises a full perimeter flexible seal spring placed between said floating dynamic, live loaded seat and said seat ring.

15. A coke drum de-heading valve comprising:
- a main body removably coupled to a coke drum, wherein said main body comprises an orifice dimensioned to align, in a concentric relationship, with an opening of said coke drum;
- a floating dynamic, live loaded seat, adjustably biased within said main body;
- at least one live seat adjustment mechanism coupled to said main body for controlling the adjustability of said floating dynamic, live loaded seat, said live seat adjustment mechanism comprising one or more biasing members;
- independent loading zones designed to provide precise point to point adjustability of said floating dynamic, live loaded seat;
- a static seat assembly secured in place by a seat retaining ring and comprising a static seat positioned opposite from and designed to counteract or counterbalance said dynamic, live loaded seat; and
- a blind or sliding blind capable moving in a manner between said dynamic, live loaded seat and said static seat to open and close said de-header valve, said sliding blind and each of said seats creating a seal therebetween said blind capable of repeated and automatic de-heading and re-heading of said coke drum without manual activity,
- wherein said coke drum is de-headed as said sliding blind is relocated from a closed to an open position.

16. A de-header valve for use during the manufacture and purging of coke, said de-header valve comprising:
(1) a main body having an orifice dimensioned to align, in a concentric relationship, with an opening of a coke drum;
(2) a live loaded seat assembly coupled to said main body and secured in place by a seat retaining ring, said live loaded seat assembly comprising:
- a dynamic, live loaded seat;
- at least one live seat adjustment mechanism coupled to said main body and designed to control and adjust the force and resulting seat load from said dynamic, live loaded seat, said live seat adjustment mechanism comprising a series of biasing load bearing members designed to allow said dynamic, live loaded seat to float;
- a force transfer module in juxtaposition to said dynamic, live loaded seat for transferring the force from said live loaded seat adjustment mechanism to said dynamic, live loaded seat;
(3) a static seat assembly secured in place by a seat retaining ring and comprising a static seat positioned opposite from and designed to counteract or counterbalance said dynamic, live loaded seat; and
(4) a blind or sliding blind capable moving in a manner within said de-header valve and between said dynamic, live loaded seat and said static seat, said blind physically controlled by an actuator and having a force exerted thereon by said dynamic, live loaded seat and said static seat, such that a seal is created between said dynamic, live loaded seat, said blind, and said static seat, said blind capable of repeated and automatic de-heading and re-heading of said coke drum without manual activity,
wherein said movement of said sliding blind serves to open and close said de-header valve, and wherein said movement of said sliding blind from a closed to an open position serves to de-head said coke drum.

17. The de-header valve of claim 16, wherein said biasing load bearing members are a series of springs.

18. The de-header valve of claim 16, wherein said biasing load bearing members are Bellevue washers.

19. A de-header valve for use during the manufacture and purging of coke, said de-header valve comprising:
(1) a main body having an orifice dimensioned to align, in a concentric relationship, with an opening of a coke drum;
(2) a live loaded seat assembly coupled to said main body and secured in place by a seat retaining ring, said live loaded seat assembly comprising:
- a dynamic, live loaded seat;
- at least one live seat adjustment mechanism coupled to said main body and designed to control and adjust the force and resulting seat load from said dynamic, live loaded seat, said live seat adjustment mechanism comprising a series of biasing load bearing members designed to allow said dynamic, live loaded seat to float;
- a force transfer module in juxtaposition to said dynamic, live loaded seat for transferring the force from said live loaded seat adjustment mechanism to said dynamic, live loaded seat;
- a full perimeter flexible seal spring placed between said dynamic, live loaded seat and said seat retaining ring that serves to provide process pressure assisted loading, said flexible seal spring working in conjunction with said biasing load bearing members to allow said dynamic, live loaded seat to float;
(3) a static seat assembly secured in place by a seat retaining ring and comprising a static seat positioned opposite from and designed to counteract or counterbalance said dynamic, live loaded seat; and
(4) a blind or sliding blind capable moving in a manner within said de-header valve and between said dynamic, live loaded seat and said static seat, said blind physically controlled by an actuator and having a force exerted thereon by said dynamic, live loaded seat and said static seat, such that a seal is created between said dynamic, live loaded seat, said blind, and said static seat, said blind capable of repeated and automatic de-heading and re-heading of said coke drum without manual activity,
wherein said movement of said sliding blind serves to open and close said de-header valve, and wherein said movement of said sliding blind from a closed to an open position serves to de-head said coke drum.

20. A de-header valve for use during the manufacture and purging of coke, said de-header valve comprising:
(1) a main body having an orifice dimensioned to align, in a concentric relationship, with an opening of a coke drum;
(2) a live loaded seat assembly coupled to said main body and secured in place by a seat retaining ring, said live loaded seat assembly comprising:
- a dynamic, live loaded seat;
- at least one live seat adjustment mechanism coupled to said main body and designed to control and adjust the force and resulting seat load from said dynamic, live loaded seat, said live seat adjustment mechanism comprising a series of biasing load bearing members designed to allow said dynamic, live loaded seat to float;

a force transfer module in juxtaposition to said dynamic, live loaded seat for transferring the force from said live loaded seat adjustment mechanism to said dynamic, live loaded seat;

a biasing element arrayed at close center around a perimeter of said seat retaining ring designed to work in conjunction with said biasing load bearing members to allow said dynamic, live loaded seat to float;

(3) a static seat assembly secured in place by a seat retaining ring and comprising a static seat positioned opposite from and designed to counteract or counterbalance said dynamic, live loaded seat; and (4) a blind or sliding blind capable moving in a manner within said de-header valve and between said dynamic, live loaded seat and said static seat, said blind physically controlled by an actuator and having a force exerted thereon by said dynamic, live loaded seat and said static seat, such that a seal is created between said dynamic, live loaded seat, said blind, and said static seat, said blind capable of repeated and automatic de-heading and re-heading of said coke drum without manual activity, wherein said movement of said sliding blind serves to open and close said de-header valve, and wherein said movement of said sliding blind from a closed to an open position serves to de-head said coke drum.

21. The de-header valve of claim 20, wherein said biasing element is comprised of a plurality of coil springs.

22. The de-header valve of claim 20, wherein said biasing element is comprised of a flexible bladder.

23. A de-header valve for use during the manufacture and purging of coke, said de-header valve comprising:

(1) a main body having an orifice dimensioned to align, in a concentric relationship, with an opening of a coke drum;

(2) a live loaded seat assembly coupled to said main body and secured in place by a seat retaining ring, said live loaded seat assembly comprising:

a floating dynamic, live loaded seat;

a plurality of live seat adjustment mechanisms coupled to said main body and spaced at equidistance around a perimeter of said floating dynamic, live loaded seat, each of said plurality of live seat adjustment mechanisms providing independent loading zones for precise point to point adjustability of said floating dynamic, live loaded seat, said plurality of live seat adjustment mechanisms comprising a series of biasing load bearing members designed to allow said dynamic, live loaded seat to float;

and a force transfer module in juxtaposition to said dynamic, live loaded seat for transferring the force from said live loaded seat adjustment mechanism to said dynamic, live loaded seat;

(3) a static seat assembly secured in place by a seat retaining ring and comprising a static seat positioned opposite from and designed to counteract or counterbalance said dynamic, live loaded seat; and (4) a blind or sliding blind capable moving in a manner within said de-header valve and between said dynamic, live loaded seat and said static seat, said blind physically controlled by an actuator and having a force exerted thereon by said dynamic, live loaded seat and said static seat, such that a seal is created between said dynamic, live loaded seat, said blind, and said static seat, said blind capable of repeated and automatic de-heading and re-heading of said coke drum without manual activity, wherein said movement of said sliding blind serves to open and close said de-header valve, and wherein said movement of said sliding blind from a closed to an open position serves to de-head said coke drum.

\* \* \* \* \*